(12) United States Patent
Thomas et al.

(10) Patent No.: US 9,813,396 B2
(45) Date of Patent: Nov. 7, 2017

(54) METHODS AND SYSTEMS FOR MANAGING CONTENT SUBSCRIPTION DATA

(71) Applicant: Rovi Guides, Inc., Santa Clara, CA (US)

(72) Inventors: William L. Thomas, Evergreen, CO (US); Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 189 days.

(21) Appl. No.: 14/928,930

(22) Filed: Oct. 30, 2015

(65) Prior Publication Data

US 2017/0126641 A1    May 4, 2017

(51) Int. Cl.
| | |
|---|---|
| *H04L 29/06* | (2006.01) |
| *H04W 12/04* | (2009.01) |
| *H04W 12/08* | (2009.01) |
| *H04W 12/06* | (2009.01) |

(52) U.S. Cl.
CPC .............. *H04L 63/06* (2013.01); *H04L 63/08* (2013.01); *H04L 63/102* (2013.01); *H04W 12/04* (2013.01); *H04W 12/06* (2013.01); *H04W 12/08* (2013.01); *H04L 65/4084* (2013.01)

(58) Field of Classification Search
CPC ....... H04L 63/06; H04L 63/08; H04L 63/102; H04L 63/11; H04L 65/4084; H04W 12/04; H04W 12/06; H04W 12/08; H04N 21/25875
See application file for complete search history.

(56) References Cited

U.S. PATENT DOCUMENTS

| | | |
|---|---|---|
| 6,073,197 A | 6/2000 | Stewart |
| 6,211,901 B1 | 4/2001 | Imajima et al. |
| 6,239,794 B1 | 5/2001 | Yuen et al. |
| 6,388,714 B1 | 5/2002 | Schein et al. |
| 6,515,680 B1 | 2/2003 | Hendricks |
| 6,542,599 B1 | 4/2003 | Miyagawa |
| 6,564,378 B1 | 5/2003 | Satterfield et al. |
| 6,756,997 B1 | 6/2004 | Ward, III et al. |
| 7,159,031 B1 | 1/2007 | Larkin |
| 7,165,098 B1 | 1/2007 | Boyer et al. |

(Continued)

*Primary Examiner* — Edward Zee
*Assistant Examiner* — Chi Nguy
(74) *Attorney, Agent, or Firm* — Haley Guiliano LLP

(57) ABSTRACT

In some aspects, control circuitry receives, at a content provider server that is associated with a first subscription service, a first authentication key from a content aggregator server that is associated with a second subscription service, prior to the user subscribing to the first subscription service. The control circuitry generates and stores, at the content provider server, the first user account after comparing the first authentication key to acceptable authentication. In response to storing the first user account, the control circuitry receives a request from the content aggregator server to subscribe the user to the first subscription service, wherein the request includes a second authentication key. The control circuitry compares the first authentication key to the second authentication key, and in response to determining that the first authentication key matches the second authentication key, validates the first user account and grants access to the first subscription service through the first user account.

20 Claims, 12 Drawing Sheets

(56) References Cited

U.S. PATENT DOCUMENTS

| | | |
|---|---|---|
| 7,240,359 B1 | 7/2007 | Sie |
| 7,464,392 B2 | 12/2008 | Sie |
| 7,761,892 B2 | 7/2010 | Ellis et al. |
| 8,046,801 B2 | 10/2011 | Ellis et al. |
| 8,266,648 B2 | 9/2012 | Olague et al. |
| 8,843,955 B2 | 9/2014 | Ellis |
| 9,003,451 B2 | 4/2015 | Boyer et al. |
| 9,203,629 B2 | 12/2015 | Momtahan |
| 2002/0013941 A1 | 1/2002 | Ward et al. |
| 2002/0156900 A1 | 10/2002 | Marquette |
| 2002/0174430 A1 | 11/2002 | Ellis et al. |
| 2002/0178446 A1 | 11/2002 | Sie |
| 2003/0110499 A1 | 6/2003 | Knudson et al. |
| 2003/0126595 A1 | 7/2003 | Sie |
| 2004/0128681 A1 | 7/2004 | Hancock et al. |
| 2005/0002638 A1 | 1/2005 | Putterman et al. |
| 2005/0005019 A1 | 1/2005 | Harville |
| 2005/0229212 A1 | 10/2005 | Kuether |
| 2005/0251827 A1 | 11/2005 | Ellis et al. |
| 2006/0035610 A1 | 2/2006 | Potrebic |
| 2006/0123451 A1 | 6/2006 | Preisman |
| 2007/0240193 A1 | 10/2007 | Sie |
| 2008/0059884 A1 | 3/2008 | Ellis et al. |
| 2008/0172696 A1 | 7/2008 | Furusawa et al. |
| 2010/0094999 A1 | 4/2010 | Rama |
| 2010/0153885 A1 | 6/2010 | Yates |
| 2010/0169475 A1 | 7/2010 | Woundy |
| 2013/0144946 A1 | 6/2013 | Subramanian |
| 2014/0089963 A1* | 3/2014 | Oh ................... H04N 21/25816 725/30 |
| 2014/0147020 A1* | 5/2014 | Baldwin ............ H04N 21/2541 382/118 |
| 2014/0156373 A1 | 6/2014 | Roberts |
| 2014/0222537 A1 | 8/2014 | Watanabe |
| 2015/0355878 A1 | 12/2015 | Corbin |

* cited by examiner

600

```
600  ...
601  Initialization Subroutine
602  ...
603  //Routine to determine the number of instances which occurred within the
     subscription period:
604
605  Receive Timestamp associated with instances
606  For each instance of the timestamp:
607    A = Accessed value of the timestamp
608    B = Accessed value of stored subscription period start timestamp
609    C = Accessed value of stored subscription period end timestamp
610        Else If (A>C)
611            Execute Subroutine to ignore the instance associated with the
     identified timestamp
612        Else If (A>B)
613            Execute Subroutine to add the instance associated with the
     identified Timestamp to a count of instances which are within the subscription
     period
614        Else
615            Execute Subroutine to determine whether all instances associated
     with Timestamps are accounted for
616  ...
617  Termination Subroutine
618  ...
```

```
800 ...
801 Initialization Subroutine
802 ...
803 //Routine to determine the number of instances which occurred within the portion
    of the subscription period:
804
805  Receive timestamp associated with instances
806  For each instance of the timestamp:
807     A = Accessed value of the timestamp
808     B = Accessed value of stored subscription period start timestamp
809     C = Accessed value of stored subscription period end timestamp
810          Else If (A>C)
811               Execute Subroutine to ignore the instance associated with the
    identified timestamp
812          Else If (A>B)
813               Execute Subroutine to add the instance associated with the
    identified timestamp to a count of instances which are within the portion of the
    subscription period
814          Else
815               Execute Subroutine to determine whether all instances associated
    with timestamps are accounted for
816 ...
817 Termination Subroutine
818 ...
```

1100 ...
1101 Initialization Subroutine
1102 ...
1103 //Routine to generate an account on a content provider server based on receiving a first authentication key from a content aggregator server
1104
1105 Receive instances of acceptable authentication keys
1106 For each instance of the acceptable authentication keys:
1107    A = Accessed value of the instance of acceptable authentication keys
1108    B = Accessed value of stored first authentication key
1109       If (A=B)
1110           Execute Subroutine to generate the first user account using control circuitry
1111       Else
1112           Execute Subroutine to retrieve the next acceptable authentication key
1113 Execute Subroutine to store generated user account
1114 ...
1115 Termination Subroutine
1116 ...

1300 ...
1301 Initialization Subroutine
1302 ...
1303 //Routine to validate a first user account based on a request
1304
1305 Receive instances of acceptable authentication keys
1306 For each instance of the acceptable authentication keys:
1307   C = Accessed value of the instance of acceptable authentication keys
1308   D = Accessed value of stored first authentication key
1309   If (C=D)
1310       Execute Subroutine to validate the first user account using control circuitry
1311     Else
1312       Execute Subroutine to retrieve next allowed authentication key
1313 Execute Subroutine to grant access to the first subscription service
1314 ...
1315 Termination Subroutine
1316 ...

FIG. 13

METHODS AND SYSTEMS FOR MANAGING CONTENT SUBSCRIPTION DATA

BACKGROUND

Services providing content subscriptions oftentimes allow users to stream content offered by multiple content providers, with each provider in a content subscription offering a finite number of streams to access the content. However, the users of content subscriptions may find the task of managing data associated with their subscription to be overwhelming, both at the time at which users sign up for the subscription and also when the users are streaming content. Namely, users may find the process of creating an account, and then remembering and maintain credential information with each account associated with each content provider to be repetitious and tedious. Additionally, users may be frustrated with an insufficient number of streams made available by a content provider, such as when all users of a content subscription are interested in viewing a new episode of a television show as soon as the episode becomes available, and the number of users exceeds the number of available streams.

SUMMARY

Accordingly, methods and systems are described herein for a media guidance application that relieves the user from having to manage multiple accounts for multiple subscription services. For example, by monitoring user activity and managing user accounts on behalf of a user, the media guidance application may recommend subscription services and/or terms of a subscription service tailored to the individual needs of the user.

Moreover, the media guidance application may act on behalf of the user to retrieve and process large amounts of data from numerous content providers in order to determine the subscription services and/or a particular plan from a particular subscription service that best meets the needs of the user. As discussed in depth below, the media guidance application may process the large amount of data (often accessible only in a computer-readable code) by comparing separate and disparate datasets in order to identify trends and statistical optimizations for the benefit of the user.

For example, the media guidance application, implemented on control circuitry, may detect a number of instances in which the number of requests to simultaneously stream media from a subscription service to different devices exceeds the number of available streams by analyzing data stream input and output metrics for a given time period. For example, the control circuitry may analyze data stream input and output metrics to detect twelve instances, during the subscription period of a user, in which the number of requests to simultaneously stream media exceeded a number of available streams. In response, the control circuitry may determine whether or not an alternative subscription service/plan, when compared to the data stream input and output metrics, may improve the number of streams available to the user, while controlling other variables (e.g., price). If so, the control circuitry may transmit a message recommending an alternative subscription service/plan (e.g., indicating that an additional stream is available for purchase).

In some embodiments, the control circuitry may detect a plurality of instances in which a number of requests to simultaneously stream media from the subscription service to different devices exceeds a number of streams available to the user from the subscription service. For example, the control circuitry may detect that in twelve instances, the number of requests to simultaneously stream media from the subscription service to different devices exceeds the number of streams available to the user from the subscription service. In other words, on twelve occasions, at least one user was unable to stream content from the content subscription service. As a result, users streaming content using the subscription may feel frustrated by being unable to view content at the time of his or her choosing. Further, users may not be aware of the ability to purchase additional streams, and may not be aware of the viewing habits of other users using the subscription. Thus, a frustrated user may see few options to improve his or her viewing experience, and may begin to stream media using competing subscription services, or may cancel his or her subscription altogether.

The control circuitry may generate a plurality of timestamps, in which each of the plurality of timestamps corresponds to one of the plurality of instances. For example, if the control circuitry detects twelve instances in which the number of requests to simultaneously stream media from the subscription service to different devices exceeds the number of streams available to the user from the subscription service, the control circuitry may generate a plurality of timestamps, where each timestamp corresponds to one of the twelve instances. As a result, the control circuitry may utilize timestamps to effectively keep track of those instances in which users were unable to stream content because of an insufficient number of available streams by correlating a timestamp to each instance.

The control circuitry may then compare each of the plurality of timestamps to a range of timestamps that corresponds to a subscription period for the subscription service in order to determine a number of the plurality of instances that occurred during the subscription period. For example, if the control circuitry generates twelve timestamps, the control circuitry may then compare each of the twelve timestamps with the subscription period for the subscription service to determine the number of instances (based on their corresponding timestamps) that fall into the subscription periods. For example, the subscription period may be defined by a start timestamp and an end timestamp. The control circuitry may then compare each of the twelve timestamps to determine whether each timestamp falls within the start and end timestamps of the subscription period. Based on the number of timestamps that fall within the range of the start and end timestamps of the subscription period, the control circuitry may determine a number of the plurality of instances that occurred during the subscription period.

In some embodiments, the control circuitry may compare, at the server, the number of the plurality of instances that occurred during the subscription period to a threshold number for the subscription period. For example, the control circuitry may determine that for a given subscription period, the threshold number is set to eight and may compare the two numbers. For example, the threshold number may indicate a number of instances after which a user may become frustrated with the lack of available streams. By determining whether or not the threshold number is surpassed, the control circuitry may determine whether or not the user is likely to want to obtain additional streams.

In some embodiments, the control circuitry may transmit a message, from the server to one of the different devices, in response to determining that the number of the plurality of instances that occurred during the subscription period exceeds the threshold number for the subscription period. For example, in response to determining that the number of the plurality of instances that occurred during the subscription period (e.g., twelve) exceeds the threshold number (e.g., eight), the control circuitry transmits a message from the server to a device indicating that the user associated with the device can purchase additional streams. By transmitting a message, the control circuitry may address the user's frustration with not being able to stream content, and may provide an opportunity for the user to address the problem of an insufficient quantity of available streams.

In some embodiments, the control circuitry may select the threshold number for the subscription period from a plurality of potential threshold numbers based on a length of time of the subscription period. For example, the control circuitry may select a low threshold number (e.g., ten) for a subscription period of one month, so as to account for the fact that there is a lower number of instances in which the number of requests to simultaneously stream media from the subscription service exceeds the number of streams available to the user from the subscription service during a shorter time period, such as a one-month period. Thus, instead of relying on a single static threshold, the control circuitry may apply a threshold related to the user's viewing habits, as individual users have varying abilities to tolerate unavailable streams.

Additionally or alternatively, the control circuitry may select the threshold number for the subscription period from a plurality of potential threshold numbers based on the number of streams available to the user from the subscription service. For example, the control circuitry may analyze the number of streams associated with subscriptions and determine that users associated with subscriptions with a higher number of available streams at one point had a lower number of streams, and had added streams in order to minimize streaming problems caused by an insufficient number of streams. Thus, control circuitry may determine that a user of a content subscription characterized by a lower number of available streams may be more likely to seek to understand how frequently the number of requests to simultaneously stream media exceeds the number of streams available to the user from the subscription service. Meanwhile, a user of a content subscription characterized by a higher number of streams available to the user from the subscription service may be less likely to seek to understand how frequently the number of requests to simultaneously stream media exceeds the number of streams available to the user from the subscription service, as the user may have already increased the number of available streams so as to avoid situations in which the number of requests to simultaneously stream media exceeds the number of streams available to the user from the subscription service.

Additionally or alternatively, the control circuitry may compare each of the plurality of timestamps to a range of timestamps that corresponds to a portion of the subscription period for the subscription service to determine a number of the plurality of instances that occurred during the portion of the subscription period. For example, the control circuitry may compare each of the timestamps to a range of timestamps that corresponds to a portion of the subscription period in which popular shows are aired (e.g., all portions of the subscription period which correspond to Wednesday 7:00 PM to 9:00 PM timeslots, which corresponds to airing of new episodes of the show "The Simpsons") and determines the occurrence of ten timestamps within the range of timestamps corresponding to the portion of the subscription period. Furthermore, the control circuitry may compare, at the server, the number of the plurality of instances that occurred during the portion of the subscription period to a threshold number for the portion of the subscription period. For example, the control circuitry compares the number of the plurality of instances that occurred during the portion of the subscription period (e.g., ten) to a threshold number (e.g., six). Lastly, the control circuitry may modify the message transmitted from the server to one of the different devices, in response to determining that the number of the plurality of instances that occurred during the portion of the subscription period exceeds the threshold number for the portion of the subscription period. For example, the control circuitry determines that number of the plurality of instances that occurred during the portion of the subscription period (e.g., ten) exceeds the threshold number (e.g., six). In response, the control circuitry modifies the message transmitted from the server to one of the devices used by the users streaming media from the subscription, by indicating, for example, the number of requests to simultaneously stream media often exceeds the number of streams available to the user from the subscription service during the corresponding portion of the subscription period (e.g., during Wednesday timeslots between 7:00 PM and 9:00 PM, which corresponds to airing of new episodes of the show "The Simpsons").

In some embodiments, the control circuitry may select the threshold number for the portion of the subscription period from a plurality of potential threshold numbers based on a length of time of the subscription period. For example, the control circuitry selects a higher number (e.g., twenty) for the threshold number for the portion of the subscription period if the length of the subscription period is longer (e.g., one year), as compared to a shorter subscription period length (e.g., one month), in which case the control circuitry selects a lower number (e.g., three). Thus, the control circuitry may account for the fact that while the probability of instances in which the number of requests to simultaneously stream media exceeds the number of streams available to the user from the subscription service is constant over time, more instances will occur in a longer time period than a shorter time period.

In some embodiments, the control circuitry may select the threshold number for the portion of the subscription period from a plurality of potential threshold numbers based on a date corresponding to the portion of the subscription period. For example, in response to determining that the date of the season premier of a popular television show (e.g., "The Simpsons") falls within the portion of the subscription period, the control circuitry selects a low threshold number for the portion of the subscription period, so as to account for the fact that a majority of the users of the subscription are interested in viewing the episodes of the season of the popular television show (e.g., "The Simpsons").

In some embodiments, the control circuitry may select the threshold number for the portion of the subscription period from a plurality of potential threshold numbers based on a time of day corresponding to the portion of the subscription period. For example, in response to determining that the portion of the subscription period (e.g., timeslots between 8:00 PM and 10:00 PM during a given day) corresponds to a time when users of the subscription are most likely to stream media, the control circuitry selects a low threshold number. Thus, control circuitry may account for the fact that time ranges of peak demand may exist based on users' viewing habits (e.g., a majority of the users of a subscription service may wish to relax after work by viewing streaming media) when selecting a threshold number.

Additionally or alternatively, the control circuitry may select the threshold number for the portion of the subscription period from a plurality of potential threshold numbers based a number of media assets that became available from the subscription service during the portion of the subscription period. For example, some subscription services regularly add new media assets (e.g., three complete seasons of "The Simpsons") to their media lineup. Control circuitry may determine the number of media assets that became available from the subscription service during the portion of the subscription period based on the number of media assets that were added to the subscription service media offerings. For example, if the number of media assets that became available from number of media assets that became available from the subscription service during the portion of the subscription period is greater than the number of media assets that became available from the subscription service during other portions of the subscription period, the control circuitry selects a low threshold number, so as to account for the fact that users of the subscription are more likely to stream media assets and thus may be more likely to seek to understand how frequently the number of requests exceeds the number of streams available to the user from the subscription service.

In some embodiments, the control circuitry may transmit a message which includes recommendations for reducing a frequency of the plurality of instances. For example, upon determining that the number of the plurality of instances that occurred during the subscription period exceeds the threshold number for the subscription period, the control circuitry transmits a message from the server to one of the different devices used by users of the subscription. The message may include recommendation for reducing the frequency of the plurality of instances. For example, the control circuitry informs a user that the user will be more likely to successfully stream media outside of a certain time (e.g., outside of the 7:00 PM and 9:00 PM Wednesday timeslot, which corresponds to airing of new episodes of the show "The Simpsons," which other users are interested in watching).

Furthermore, by subscribing to a content aggregator service, users may become authorized to access media content offered by multiple subscription services. The media content offered by each subscription service is not always made directly available at the content aggregator service, thus forcing the user to access the content via each content provider's website. Before being able to access the content, the user must create an account with each content provider, a task which the user may find to be repetitious and tedious. Additionally, the process of remembering and maintaining the credential information associated with multiple subscription service accounts may further overwhelm the user.

In some embodiments, control circuitry may automatically receive authentication information from a content aggregator service. For example, the media guidance application, implemented on control circuitry, may receive authentication information and associate the authentication information with a user account, prior to the control circuitry receiving a request to subscribe the user to the subscription service. The control circuitry may then receive a request to subscribe the user to the subscription service and thus validate the account and grant access to the subscription service's offerings to the user.

The control circuitry may receive, at a content provider server that is associated with a subscription service (e.g., Hulu), a first authentication key from a content aggregator server that is associated with a second subscription service (e.g., Rovi Super Aggregator), where the first authentication key is received prior to a user subscribing to the first subscription service. For example, a user may subscribe to a content aggregator service (i.e., the second subscription service). As soon as the user completes his or her registration with the second subscription service, the control circuitry implemented on the content aggregator server associated with the second subscription service may generate authentication keys to associate the user with some or all of the subscription services that are available as part of the content aggregator subscription, and transfer the generated authentication keys to servers associated with each subscription service (e.g., the first subscription service). Each authentication key may be encrypted in order to ensure that the information stored in the key is transmitted securely to the servers associated with each subscription service. Additionally, each authentication key may include information identifying the user and the second subscription service. The control circuitry implemented on the content provider server associated with the first subscription service may then receive the generated authentication key from the content aggregator server. In some instances, the control circuitry implemented on the content provider server may decrypt the authentication key and extract information stored in the key. The control circuitry may additionally store the authentication key on the content provider server. In such a way, the authentication information associated with the first user may be transmitted to the first subscription service without burdening the user with manually creating an account.

The control circuitry implemented on the content provider server may compare the first authentication key to a first plurality of acceptable authentication keys to determine whether or not to generate a first account for the first subscription service based on the first authentication key. For example, control circuitry implemented on the content provider server may extract information stored in the first authentication key, and determine the name of the subscription service (e.g., Rovi Super Aggregator) listed in the part of the key related to identifier of the second subscription service. The control circuitry may then retrieve a list of subscription services which the control circuitry had previously identified to be permitted to generate user accounts on the first subscription service, and compare the name of the subscription service to each subscription service in the retrieved list. In effect, the control circuitry implemented on the content provider server can securely receive information about new users from content aggregators (i.e., the second subscription service), while maintaining control over the accounts that are created. For example, a first subscription service may enter into an agreement with a second subscription service to offer subscriptions on the first subscription service at a discounted price. Thus, by encapsulating information about the second provider in the authentication key, the first subscription service ensures that only accounts of users associated with trusted content aggregators are created.

The control circuitry implemented on the content provider server, in response to determining that the first authentication key matches one of the first plurality of acceptable authentication keys, may generate, at the content provider server, the first user account. For example, the control circuitry may use information contained in the authentication key, such as username, password, and subscription service name, in order to create the information necessary for generating an account on the content provider server. In some instances, the control circuitry may store an indication associated with the first account, specifying that the account is not validated. In other words, the account, although created, is not accessible by the user. Should the user or the second subscription service decide to validate the account in the future, the control circuitry implemented on the content provider server may efficiently validate the account with little or no required input from the user, as will be explained in further detail below.

The control circuitry implemented on the content provider server may store the first user account in a database entry that indicates that the first user account corresponds to the first authentication key. For example, the control circuitry implemented on the content provider server may store the information related to the generated user account in a database entry stored in a database. The control circuitry may further associate the user account with the authentication key, for example, by storing a pointer to the location of the authentication key in the database entry associated with the user account. By associating the stored user account with the first authentication key, the control circuitry implemented on the content aggregator server may ensure that the account may be quickly validated in the event that the second subscription or the user decides to validate the account on the first subscription service.

The control circuitry implemented on the content provider server, subsequent to storing the first user account, may receive, at the content provider server, a request from the content aggregator server to subscribe the user to the first subscription service, wherein the request includes a second authentication key. The control circuitry may receive the second authentication key in response to a user request to subscribe to the first subscription service. For example, the control circuitry implemented on the content aggregator server may detect that a user of the second subscription service (e.g., Rovi Super Aggregator) desires to subscribe to the first subscription service (e.g., Hulu). In a different example, the control circuitry implemented on the second service may automatically send a request to the first service, when the cost of subscribing to the first service meets a cost criterion. The control circuitry on the first subscription service may decrypt the information stored in the second key, retrieve information stored in the second key, and store the authentication key on the content provider server. By providing a framework to receive the second authentication key, the control circuitry implemented on the content provider server may securely validate an account for the user.

The control circuitry implemented on the content provider server may compare the first authentication key to the second authentication key. For example, the control circuitry implemented on the content provider server may retrieve information from the second key related to the name of the user associated with the key, and may then query the database to determine whether an account associated with the identified user has previously been created. In a different example, the control circuitry implemented on the content provider server may compare the unencrypted data comprising the second authentication key with the unencrypted data of previously received authentication keys stored on the content provider server.

The control circuitry implemented on the content provider server may validate the first user account in response to determining that the first authentication key matches the second authentication key. For example, based on the comparing of the first authentication key to the second authentication key, the control circuitry implemented on the content provider server may then identify the user account associated with either key. The control circuitry may then query the database to identify the account, and store an indication specifying that the account has been validated. By validating the account, the control circuitry implemented on the content provider server allows a user authenticated by the content provider server to access media content offered by the first subscription service.

In some embodiments, in response to validating the first user account, the control circuitry implemented on the first server may grant access to the first subscription service through the first user account. For example, the control circuitry implemented on the content provider server may generate and transmit a message to the content aggregator server, indicating that the account is available for use. In this manner, the control circuitry implemented on the content provider server is able to notify the user that the offerings of the second subscription service may be accessed by the user.

In some embodiments, the first authentication key is an encryption key based on a username and password for the user assigned by the second subscription service. For example, the authentication key may include an automatically generated password compliant with the password requirements of the first subscription service, and a username corresponding to a username associated with the content provider server.

In some embodiments, the first plurality of acceptable authentication keys is received at the content provider server from the content aggregator server. For example, the control circuitry implemented at the content provider server may receive a list of authentication keys from the second subscription service at regular intervals. For example, the control circuitry implemented on the content aggregator server may transmit, on a daily basis, authentication keys associated with all new users that have created an account with the second subscription service.

In some embodiments, the database entry stored at the content provider server includes a first database field that includes a pointer to the first user account and a second database field that includes the first authentication key. For example, the database entry on the content provider server may include a pointer stored in a first database field that refers to a second database entry containing information about the user's account, such as the user's username, password, and subscription level.

In some embodiments, the database entry stored at the content provider server includes a third database field that includes subscription terms for the first subscription service. The terms of the subscription may determine the price of the subscription; the price that the user incurs for subscribing may also be stored in the third database field.

In some embodiments, the request from the content aggregator server to subscribe the user to the first subscription service is transmitted from the content aggregator server without further user input in response to the user selecting a subscription level for the second subscription service at the content aggregator server. For example, the control circuitry implemented on the content aggregator server may generate two subscription levels: a "premium" level, which may include a subscription to the first subscription service, and a "basic" level, which does not include a subscription to the first subscription service. The control circuitry implemented on the content aggregator server may transmit a request to the second subscription service only in response to determining that the user has selected the "premium" level subscription.

In some embodiments, the control circuitry implemented on the content provider server may transmit, from the content provider server, a confirmation to the content aggregator server in response to validating the first user account. For example, once the control circuitry validates the user account, the control circuitry may transmit a message comprising a confirmation to the content aggregator server. By transmitting a confirmation, the user of the second service may be informed that he or she is able to access the media associated with the first subscription service.

In some embodiments, the control circuitry implemented on the content provider server may receive a request from the content aggregator server to access media content of the first subscription service through the first user account. For example, the control circuitry implemented on the content provider server may receive a user request to access media content (e.g., an episode of the television show "The Simpsons"). In response to receiving the request from the content aggregator server to access media content of the first subscription service through the first user account, the control circuitry implemented on the content aggregator server may create a direct connection between the content provider server and the user television equipment 402. By creating a direct connection, the media content may be transferred more quickly and efficiently between content provider server and user television equipment 402 than if the media content were to be transferred from the content provider server to the content aggregator server before transferring to the user television equipment 402.

In some embodiments, the control circuitry implemented on the content aggregator server may retrieve a user interface skin associated with the first subscription service in response to a direct connection between the content provider server and the and user television equipment 402. For example, a user interface skin associated with the first subscription service may define the visual appearance of user interface elements, such as background colors, font, and menu location of a user interface associated with the first subscription service. Additionally, the interface skin may include branding characteristics defined by the subscription service, such as a logo associated with the first subscription service, which may be displayed at a defined location on the screen, and a color palette associated with the first subscription service, which nay define the background color of screen elements. The control circuitry may extract the parameters associated with the user interface skin and apply the parameters to the user interface skin associated with the second subscription service.

In some embodiments, the control circuitry implemented on the content provider server may receive, from the content aggregator server, a user selection through the first user account of a media content listing. For example, the control circuitry implemented on the content aggregator server may utilize a connection created between the content provider server and the content aggregator server to retrieve media content listings of content available on the content provider server. The control circuitry implemented on the content aggregator server may then detect a selection of a media content listing made by a user, where the user is associated with the account on the content aggregator server. Once the control circuitry implemented on the content aggregator server receives the selection, the control circuitry may generate for display the media asset corresponding to the media content listing selected by the user. For example, the control circuitry implemented on the content aggregator server may retrieve the media asset using a connection created between the content provider and content aggregator server. The media asset may be retrieved via download or via streaming.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a pseudo code of illustrative steps for determining a number of instances in a subscription period, in accordance with some embodiments of the disclosure;

FIG. 8 is a pseudo code of illustrative steps for determining a number of instances in a portion of a subscription period, in accordance with some embodiments of the disclosure;

FIG. 11 is a pseudo code of illustrative steps for generating an account on a content provider server based on receiving a first authentication key from a content aggregator server, in accordance with some embodiments of the disclosure;

FIG. 13 is a pseudo code of illustrative steps for validating a first user account based on a request from a content aggregator server, in accordance with some embodiments of the disclosure.

DETAILED DESCRIPTION

Figure 1:
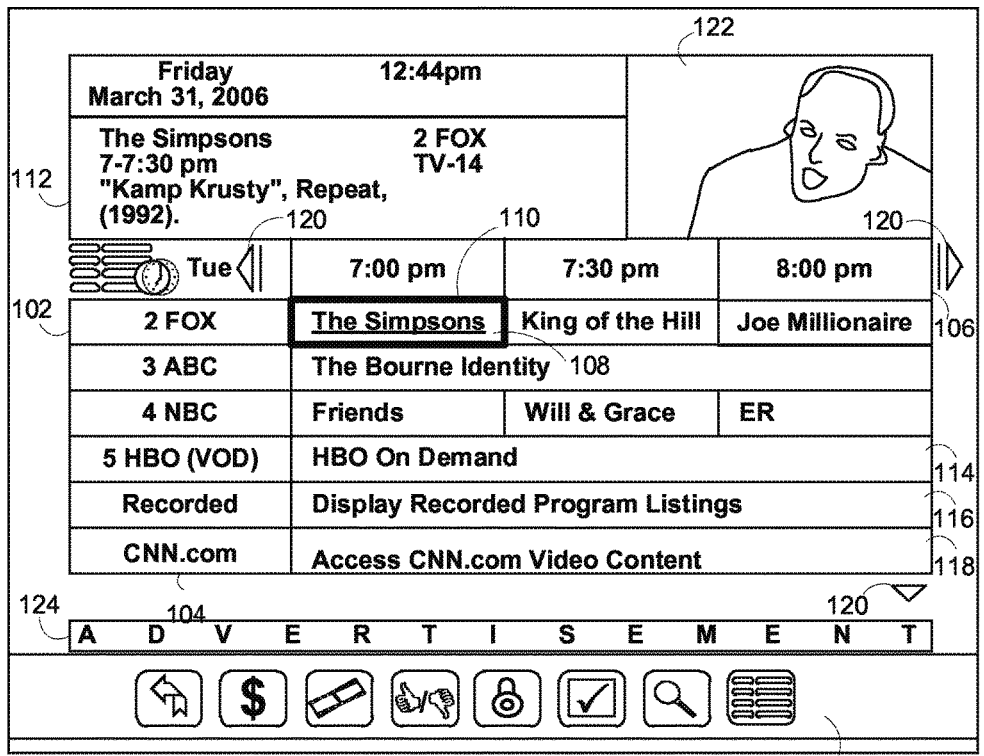
FIG. 1 shows an illustrative example of a display screen generated by a media guidance application in accordance with some embodiments of the disclosure.

Methods and systems are disclosed herein for detecting a number of instances in which the number of requests to simultaneously stream media from a subscription service to different devices exceeds the number of available streams, and for transmitting a message to one of the devices when the number of instances exceeds a certain number. For example, the control circuitry determines that during the subscription period, there are twelve instances in which the number of requests to simultaneously stream media exceeds a number of available streams available to the user from the subscription service. Further, the control circuitry may determine that the number of instances in which the number of requests to simultaneously stream media exceeds the number of available streams available to the user from the subscription service surpassed the threshold number of eight occasions, and in response, the control circuitry transmits a message to one of the devices indicating that an additional stream is available for purchase.

As used herein, the term "instance" should be understood to correspond to a particular moment in time. For example, an instance corresponds to a particular timestamp, such as a timestamp defined by a date and time.

As used herein, the term "subscription service" should be understood to refer to any product or service to which a user subscribes to in order to access media content. For example, a user subscribes to an online subscription service (e.g., Hulu) to access a television series (e.g., "The Simpsons"). A user may be able to access media content offered by the subscription service by purchasing a content subscription. An entity which provides access to content through a "subscription service" is referred to herein as a "content provider." The term "content provider server" refers to any networked device used by the content provider to provide access to media content to user equipment.

A product or service which provides access to the media content available from other subscription services is referred to herein as a "content aggregator subscription." An entity which provides a content aggregator subscription is referred to herein as a "content aggregator." The term "content aggregator server" refers to any networked device used by the content aggregator to collect and provide data regarding content available from content providers, and to facilitate access to such content to user equipment.

As used herein, the term "account" should be understood to refer to data associated with a user and stored in a database of a subscription service. A subscription service allows users to access media content by authenticating a user through data stored in an account. Additionally, an account may include information listing the user's name, password, credit card information, viewing preferences, and subscription settings. A validated user account may be used by a user to access media content, while an account that has not yet been validated may not be used by a user to access the media content.

As used herein, an "authentication key" should be understood to refer to data which may be deciphered by an algorithm. For example, a username and password of a user may be encrypted on a content aggregator server. The resultant data may constitute an authentication key, which may then be transferred to a content provider server. The content provider server may contain information necessary to decrypt the first key.

As used herein, the term "subscription period" should be understood to refer to a consecutive period of time during which users of a subscription service are able to access media content offered by the subscription service. For example, a subscription period may correspond to a billing cycle of the subscription service (e.g., a subscription period corresponds to the month of March). Further, a subscription period may be associated with a start timestamp (i.e., the date and time at which the media offered through the subscription became available to the user), and an end timestamp (i.e., the date and time at which the media offered through the subscription ceases to be available to the user). A "portion" of a subscription period may refer to any consecutive or non-consecutive time range or ranges of a subscription period. For example, a portion of a subscription period corresponds to timeslots occurring between 7:00 PM to 9:00 PM on Wednesdays during the subscription period. In a different example, a portion of the subscription period corresponds to a range of dates of the subscription period during which a season of a television show (e.g., "The Simpsons") is broadcast, for example, August through November.

The term "stream" refers to media content data that is transmitted from a sender to a receiver over a period of time. For example, digital data corresponding to media content (e.g., an episode of "The Simpsons") is delivered over a network from a server (i.e., sender) to a user device (i.e., receiver), over a time corresponding to the time required for playback of the media content. A subscription service may provide a finite number of streams for simultaneous use to the users of the subscription (e.g., the subscription service allows for four simultaneous streams of media content). Embodiments implementing the streaming process (i.e., the process of delivering a stream) may be applied to digital medium delivery methods, but also other content delivery methods (e.g., cable). A streaming conflict refers to a situation in which the number of requests to stream media exceeds the number of available streams. When a streaming conflict occurs, at least one of the received requests (e.g., typically the latest request) is not fulfilled.

The term "direct connection" refers to a network connection which, once established between a content provider server and a content aggregator server, allows the content aggregator server to access data stored on the content provider server without authentication.

The term "interface skin" refers to a collection of data used for defining the visual appearance of a user interface. For example, the background color of a window in a user interface, the font used in a user interface, and the position of a menu in the user interface may be defined in data associated with an interface skin. When the control circuitry generates the visual components of a user interface for display, the control circuitry may retrieve the data of an interface skin file to determine how each element or group of elements in a user interface is to be rendered. Additionally, the collection of data used for defining the visual appearance of a user interface may include graphics and text defined by the service associated with the content provider server. For example, the interface skin associated with a subscription service (e.g. Hulu) may include a collection of data including a Hulu logo which may be displayed at a defined location on the screen, and the Hulu color palette, which may define the background color of screen elements.

As referred to herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
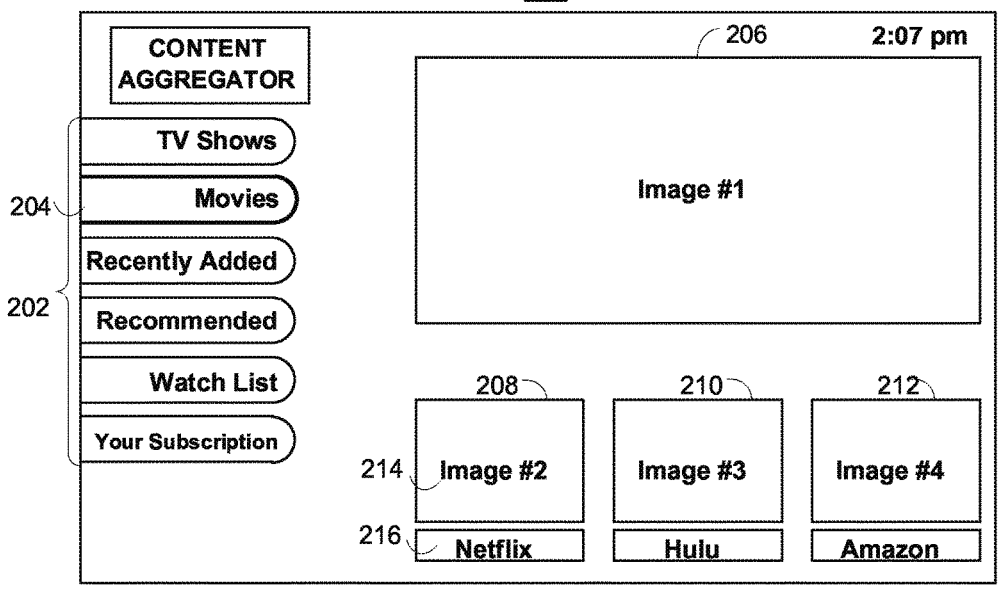
FIG. 2 shows another illustrative example of a content aggregator display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO providing "The Sopranos" and "Curb Your Enthusiasm" via the HBO GO service). THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on c various organization criteria, such as recommendations, inclusion in a watch list, and type of content. In display 200, movie listing option 204 is selected, thus providing listings 206, 208, 210, and 212 as movies. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the specified content provider).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
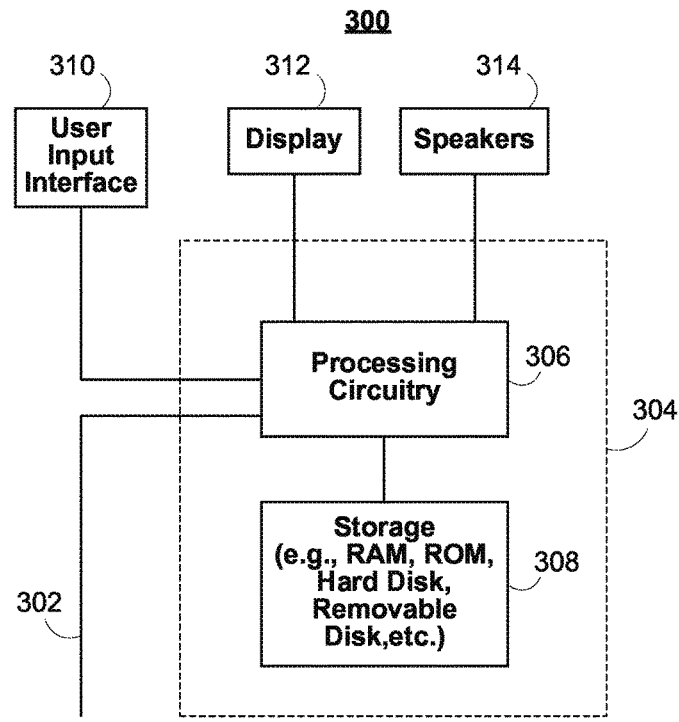
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative equipment device 300. More specific implementations of devices are discussed below in connection with FIG. 4. Equipment device 300 may be implemented on user television equipment 402, user computer equipment 404, and wireless user communications device 406. Additionally, device 300 may be implemented as part of the servers associated with content providers 416 and 418, and as part of the server associated with content aggregator 430. Device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of equipment devices, or communication of equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of equipment device 300. Circuitry 304 may also include digital-to-analog converter circuitry and analog-to-digital converter circuitry for converting between digital and analog signals. The tuning and encoding circuitry may be used by the equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from equipment device 300, the tuning and encoding circuitry (including multiple tuners) may be associated with storage 308.

When equipment device 300 is implemented on user television equipment 402, user computer equipment 404, or wireless user communications device 406, a user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on equipment device 300 is retrieved on-demand by issuing requests to a server remote to the equipment device 300. In one example of a client-server based guidance application, control circuitry 304 runs a web browser that interprets web pages provided by a remote server.

For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
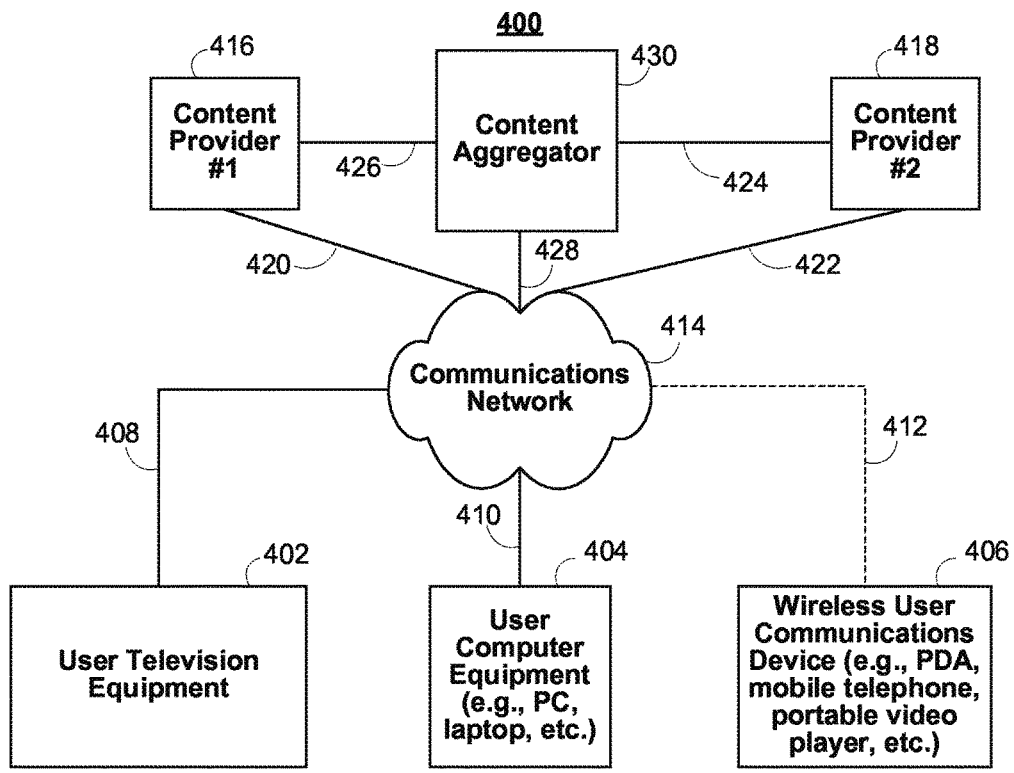
FIG. 4 is a block diagram of an illustrative media system in accordance with some embodiments of the disclosure.

Equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Additionally, equipment device 300 may be implemented as part of the servers associated with content providers 416 and 418, and as part of the server associated with content aggregator 430.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, and wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content providers 416 and 418, as well as content aggregator 430 coupled to communications network 414 via communication paths 420, 422, 424, 426, and 428, respectively. Paths 420, 422, 424, 426, and 428 may include any of the communication paths described above in connection with paths 408, 410, and 412. Communications with the content provider 416 and content aggregator 430 may be exchanged over one or more communications paths, but are shown as a single path in FIG. 4 to avoid overcomplicating the drawing. In addition, there may be more than one of each of content provider 416 and content aggregator 430, but only two content providers and one content aggregator is shown in FIG. 4 to avoid overcomplicating the drawing. (The different types of each of these sources are discussed below.) Although communications between content providers 416 and 418 with user equipment devices 402, 404, and 406 are shown as through communications network 414, in some embodiments, content providers 416 and 418 may communicate directly with user equipment devices 402, 404, and 406 via communication paths (not shown) such as those described above in connection with paths 408, 410, and 412. In some cases, communications between content providers 416 and 418 with user equipment devices 402, 404, and 406 occur through content aggregator 430. For example, communications between user television equipment 402 and content provider 416 may occur over paths 426, 428, and 408.

Content providers 416 and 418 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers (e.g., Netflix, Hulu, Amazon, etc.), and other content providers. NBC is a trademark owned by the National Broadcasting Company, Inc., ABC is a trademark owned by the American Broadcasting Company, Inc., and HBO is a trademark owned by the Home Box Office, Inc. Content provider 416 may be the originator of content (e.g., a television broadcaster, a Webcast provider, etc.) or may not be the originator of content (e.g., an on-demand content provider, an Internet provider of content of broadcast programs for downloading, etc.). Content provider 416 may include cable sources, satellite providers, on-demand providers, Internet providers, over-the-top content providers, or other providers of content. Content provider 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Content aggregator 430 may collect media guidance data from content providers 416 and 418, and provide such data, as described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels. In some embodiments, the control circuitry 304 implemented on content aggregator 430 may transmit a request over paths 426 and 424 for media guidance data from content providers 416 and 418.

Content aggregator 430 may communicate with equipment devices 402, 404, and 406 by way of clients installed on each of the equipment devices. For example, when a user initially subscribes to the content aggregator subscription, control circuitry 304 implemented on content aggregator 430 may facilitate the transfer of a client application to the equipment device. Control circuitry 304 implemented on each of equipment devices 402, 404, and 406 may then download, install, and configure the client application from content aggregator 430. The client application may then facilitate the delivery of media and media guidance data from content aggregator 430 to the equipment devices. The client application may further include a user interface, which control circuitry 304 implemented on equipment device 300 generates for display on display 312, for allowing the user to interact with media listings using user input interface 310, code for handling Digital Rights Management (DRM) data, as well as codecs and players needed for generating media for display on display 312. In some embodiments, the client may be configured to communicate directly with content providers 416 and 418. Content aggregator 430 may include a corresponding communications interface, so that control circuitry 304 implemented on the content aggregator may receive input from the client implemented on each equipment device. Control circuitry 304 implemented on content aggregator 430 may then send and receive data from each client, as well as from each content provider 416 and 418 using the communications interface. Content aggregator 430 may additionally include one or more databases to store subscriber information, and media content listings from content providers 416 and 418.

In some embodiments, content aggregator 430 may communicate with equipment devices by way of an internet browser available on equipment devices 402, 404, and 406. For example, user computer equipment 404 may include an implementation of Internet Explorer. When the user wishes to access media offerings of the content aggregator subscription (e.g., a user may wish to access Netflix listings available as part of the content aggregator subscription to which the user subscribes to), control circuitry 304, implemented on equipment device 404, may output a browser window containing video mosaic display 200 on display 312. Control circuitry 304 implemented on equipment device 404 may then receive a selection from user input interface 310, indicating that the user wishes to access content from a subscription service that is part of the content aggregator subscription. For example, the user may direct a mouse pointer to highlight and select text portion 216 (e.g., Netflix) . Control circuitry 304 implemented on equipment device 404 may then transmit the input corresponding to text portion 216 to the process running the internet browser, enabling the browser to retrieve and display the internet web site (e.g., www.netflix.com) associated with the selected subscription service.

In some embodiments, guidance data from content aggregator 430 may be provided to users' equipment using a client-server approach. For example, a user equipment device may pull media guidance data from a server, or a server may push media guidance data to a user equipment device. In some embodiments, a guidance application client residing on the user's equipment may initiate sessions with content aggregator 430 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Content aggregator 430 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of an equipment device 300. In some embodiments, media guidance applications may be client-server applications where only a client application resides on the user equipment device, and server application resides on a remote server. For example, media guidance applications may be implemented partially as a client application on control circuitry 304 of equipment device 300 and partially on a remote server as a server application (e.g., content aggregator 430) running on control circuitry of the remote server. When executed by control circuitry of the remote server (such as content aggregator 430), the media guidance application may instruct the control circuitry to generate the guidance application displays and transmit the generated displays to the user equipment devices. The server application may instruct the control circuitry of the content aggregator 430 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content provider 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content provider 416 and one or more content aggregators 430. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Services providing content subscriptions oftentimes allocate a finite number of streams to each subscription in order to allow users to simultaneously stream media. However, the number of streams allocated to each subscription is limited based on the type of subscription. In effect, when all available streams of a subscription are in use, a user of the content subscription wishing to stream media may be forced to either wait until a stream becomes available, or elect to take control of a stream used by another user. This becomes especially frustrating for users when, for example, all users of a content subscription are interested in viewing a new episode of a television show as soon as the episode becomes available, and the number of users exceeds the number of available streams. Furthermore, users may be unaware of options to purchase additional streams, and may also not be aware of the frequency with which other users of the content subscription find themselves unable to view content due to streams being unavailable.

Accordingly, methods and systems are described herein from a media guidance application that relieves the user from having to manage multiple accounts for multiple subscription services. For example, by monitoring user activity and managing user accounts on behalf of a user, control circuitry 304 may recommend subscription services and/or terms of a subscription service tailored to the individual needs of the user.

Moreover, control circuitry 304 may act on the behalf of the user to retrieve and process large amounts of data from numerous content providers in order to determine the subscription services and/or a particular plan from a particular subscription service that best meets the needs of the user. As discussed in depth below, the media guidance application may process the large amount of data (often accessible only in a computer-readable code) by comparing separate and disparate datasets in order to identify trends and statistical optimizations for the benefit of the user.

In some embodiments, control circuitry 304 may be configured to associate a number of available streams available to the user from the subscription service with a subscription associated with a user. Control circuitry 304 may be implemented at a server, such as within media content provider 416 or within content aggregator 430. Control circuitry 304 implemented on content aggregator 430 may communicate, using communications network 414, with various devices used by users accessing the subscription. These devices may include user television equipment 402, user computer equipment 404, and wireless user communications devices 406. For example, control circuitry 304 receives a request to stream media content (e.g., an episode of the television show "The Simpsons") from media content provider 416 to computer equipment 404. Control circuitry 304 implemented on content aggregator 430 then streams the media content, using communications network 414, to user computer equipment 404, should control circuitry 304 implemented on content aggregator 430 determine that the number of requests does not exceed the number of available streams.

In some embodiments, control circuitry 304 may record data associated with each request in a log stored in storage 308. For example, in response to a request to stream media content, control circuitry 304 records a timestamp associated with the request, a reference to the requested media content (e.g., a reference to an episode of the television show "The Simpsons"), an identifier of the user requesting the content, an identifier of the device which the user is using to request the content, and the number of streams available at the time of the request. Additionally, control circuitry 304 may store an indication of whether the request was fulfilled. To provide this indication, control circuitry 304 may compare the number of streams available to the total number of requests to stream media at the time of the request. Control circuitry 304 may then store an indication of whether the request was fulfilled.

In some embodiments, control circuitry 304 may record, in a log stored in storage 308, start timestamps and end timestamps associated with each request to stream media data. Control circuitry 304 may utilize timestamps to effectively keep track of those instances in which users were unable to stream content because of an insufficient number of available streams, by correlating a timestamp to each instance. For example, a start timestamp corresponds to a time at or near the time at which control circuitry 304 received the request to stream media to a user device. An end timestamp may indicate a time at or near the time at which control circuitry 304 ceased to send the stream to the user device (e.g., when the playback of the media concluded, or when the user requested to terminate playback of the media). When control circuitry 304 receives a request to stream media to a device, and the number of total requests at the time the request is received exceeds the number of streams available to the user, control circuitry 304 may record only a start timestamp, without recording an end timestamp, so as to indicate that the request to stream media was not fulfilled.

In some embodiments, control circuitry 304 may associate a finite number of streams with a subscription. For example, control circuitry 304 associates nine streams with the subscription of a user, Robert. In other words, nine streams are available for Robert to use for streaming content. Accordingly, should any other user request to stream media using Robert's subscription, their request will be fulfilled, as long as, at time the request is made, the number of requests does not exceed the number of available streams.

In some embodiments, control circuitry 304 may detect a plurality of instances in which a number of requests to simultaneously stream media from the subscription service to different devices exceeds a number of streams available to the user from the subscription service. For example, control circuitry 304 retrieves records stored in a log in storage 308 in order to identify records that include an identifier indicating that a given request associated with the record was not fulfilled. In another example, control circuitry 304 retrieves start timestamps associated with requests from a log stored in storage 308. For each retrieved start timestamp, control circuitry 304 may determine the number of overlaps with timestamp ranges defined by paired start timestamps and end timestamps. For example, a timestamp range corresponds to the duration of time between a start timestamp (i.e., corresponding to the time associated with a time or near a time at which control circuitry 304 received the request to stream media to a user device) and an end timestamp (i.e., corresponding to a time at or near the time at which control circuitry 304 ceased to send the stream to the user device). Control circuitry 304 may then determine whether the number of overlaps is greater than the number of streams available to the user from the subscription service. In the case that the number of overlaps is greater than the number of available streams, control circuitry 304 may associate the overlap with an instance. Control circuitry 304 may further analyze all timestamps, or a subset of timestamps, stored in the log to determine the number of instances in which the number of requests to simultaneously stream media from the subscription service to different devices exceeds the number of streams available to the user from the subscription service. For example, control circuitry 304 detects twelve instances in which the number of requests to simultaneously stream media from the subscription service to different devices exceeds the number of streams available to the user from the subscription service. In other words, on twelve occasions, at least one user was unable to access a stream from the subscription service.

In some embodiments, control circuitry 304 may generate a plurality of timestamps, in which each of the plurality of timestamps corresponds to one of the plurality of instances. For example, based on detecting a number of instances in which the number of requests to simultaneously stream media from the subscription service to different devices exceeds the number of streams available to the user from the subscription service, control circuitry 304 stores a timestamp associated with each instance in a list in storage 308. Continuing the above example of analyzing start timestamps and end timestamps, control circuitry 304, after detecting the plurality of instances in which the number of requests to simultaneously stream media from the subscription service to different devices exceeds the number of streams available to the user from the subscription service, associates each instance with the corresponding start timestamp. For example, if control circuitry 304 detects twelve instances in which the number of requests to simultaneously stream media from the subscription service to different devices exceeds the number of streams available to the user from the subscription service, control circuitry 304 generates and stores in storage 308 a list of timestamps, where each timestamp corresponds to one of the twelve instances.

In some embodiments, control circuitry 304 may compare each of the plurality of timestamps to a range of timestamps that corresponds to a subscription period for the subscription service to determine a number of the plurality of instances that occurred during the subscription period. For example, if control circuitry 304 generates twelve timestamps, control circuitry 304 then compares each of the twelve timestamps with the subscription period for the subscription service to determine the number of instances (based on their corresponding timestamps) that fall into the subscription period. As previously discussed, the subscription period may be defined by a start timestamp and an end timestamp. Control circuitry 304 then compares each of the twelve timestamps to determine whether each timestamp falls within the range of time defined by the start and end timestamps of the subscription period. Based on the number of timestamps that fall within the range, control circuitry 304 may determine the number of the plurality of instances that occurred during the subscription period. For example, control circuitry 304 determines that out of the twelve generated timestamps, nine fall within the range of time defined by the start and end timestamps of the subscription period.

In some embodiments, control circuitry 304 may compare, at the server, the number of the plurality of instances that occurred during the subscription period to a threshold number for the subscription period. For example, the threshold number may indicate a number of instances after which a user may become frustrated with the lack of available streams. By determining whether or not the threshold number is surpassed, the control circuitry may determine whether or not the user is likely to want to obtain additional streams. As will become more apparent below, control circuitry 304 may utilize different approaches to determine a threshold number for the subscription period. Thus, instead of relying on a single static threshold, the control circuitry may apply a threshold derived from the user's viewing habits, as individual users have varying abilities to tolerate unavailable streams. For example, control circuitry 304 bases the threshold number on the number of streams available to the user from the subscription service. For example, control circuitry 304 targets users who are consistently faced with unavailable streams. To that end, control circuitry 304 sets the threshold number to a lower number (e.g., four), if control circuitry 304 determines that number of streams available to the user from the subscription service (e.g., nine streams) is higher than an average number of streams available to an average user of the subscription service (e.g., an average user may be associated with only two streams). Because users in a subscription associated with multiple streams may have previously added extra streams to minimize streaming conflicts, such users may already be sensitive to experiencing further streaming conflicts. Therefore, control circuitry 304 may target users in such systems when the number of streaming conflicts exceeds a lower threshold.

In some embodiments, control circuitry 304 may transmit a message, from the server to one of the different devices via communications network 414, in response to determining that the number of the plurality of instances that occurred during the subscription period exceeds the threshold number for the subscription period. By transmitting a message, control circuitry 304 may address the user's frustration with not being able to stream content, and may provide an opportunity for the user to address the problem of an insufficient quantity of available streams. Control circuitry 304 may determine whether or not an alternative subscription service/plan, when compared to the data stream input and output metrics, may improve the number of streams available to the user, while controlling other variables (e.g., price). If so, the control circuitry may transmit a message recommending an alternative subscription service/plan (e.g., indicating that an additional stream is available for purchase). For example, in response to determining that the number of the plurality of instances that occurred during the subscription period (e.g., twelve) exceeds the threshold number (e.g., eight), control circuitry 304 transmits a message from the server to a device, indicating that a user associated with the device can purchase additional streams. Control circuitry 304 may generate the message to indicate that the user is able to buy additional streams due to frequent streaming conflicts. Control circuitry 304 may transmit the message for display on display 312 of user television equipment 402, user computer equipment 404, or wireless communications device 406. For example, control circuitry 304 generates the message for display in a program listings display 100 which is displayed on display 312 of user television equipment 402.

In some embodiments, control circuitry 304 may select the threshold number for the subscription period from a plurality of potential threshold numbers based on a length of time of the subscription period. Control circuitry 304 may determine a length of time associated with the subscription period by accessing data associated with the subscription stored in storage 308. For example, control circuitry 304 determines the length of the subscription period based on a start timestamp and an end timestamp of a subscription period. For example, control circuitry 304 determines a subscription period of one month. In this example, it may be undesirable to set a low threshold, as users may be uninterested in acting on the message if users do not perceive a need to increase the number of streams or alter their viewing habits, because the number of instances in which the number of requests to simultaneously stream media from the subscription service exceeds the number of streams available to the user from the subscription service) is unlikely to be high. To that end, control circuitry 304 selects a low threshold number (e.g., ten) so as to account for the fact that there may be, on average, a lower number of instances in which the number of requests to simultaneously stream media from the subscription service exceeds the number of streams available to the user from the subscription service during a one-month period, as compared to, for example, a six-month period. Accordingly, control circuitry 304 sets a larger threshold if the length of time is determined to be longer (e.g., one year).

In some embodiments, control circuitry 304 may store a plurality of thresholds in association with subscription periods in storage 308. For example, control circuitry 304 analyzes how frequently streaming conflicts (e.g., the number of instances in which the number of requests to simultaneously stream media from the subscription service exceeds the number of streams available to the user from the subscription service) occur during a subscription period of a given length. Control circuitry 304 further correlates the instances in which a conflict occurred during a subscription period with instances in which a user performed an action related to his or her subscription. For example, control circuitry 304 determines that a user added new streams to his or her subscription around a time in which a number of conflicts (e.g., situations in which users were frustrated with streaming conflicts, and acted to avoid future streaming conflicts by increasing the number of streams available) occurred. In another example, control circuitry 304 determines that the user cancelled his or her subscription around a time in which a certain number of conflicts occurred (e.g., situations in which a user was frustrated with streaming conflicts, and accordingly, acted to cancel his or her subscription). Control circuitry 304 may perform a statistical analysis on those instances in which an action performed on a subscription is correlated with a certain number of streaming conflicts, in order to determine an effective threshold number to associate with a subscription period length. In this way, control circuitry 304 determines threshold numbers which would allow it to effectively target users frustrated by streaming conflicts by transmitting helpful messages, while at the same time avoiding encumbering other users who may likely not be experiencing frustration with streaming conflicts. Control circuitry 304 may save the threshold number in a record associated with a given subscription period in storage 308.

In some embodiments, control circuitry 304 may select the threshold number for the subscription period from a plurality of potential threshold numbers based on the number of streams available to the user from the subscription service. For example, a user of a subscription characterized by a lower number of streams available to the user from the subscription service is more likely to seek to understand how frequently the number of requests to simultaneously stream media exceeds the number of streams available to the user from the subscription service, because streaming conflicts are more likely to occur when only one or two streams are available. Meanwhile, a user of a subscription characterized by a higher number of streams available to the user from the subscription service is less likely to be interested in understanding how frequently the number of requests to simultaneously stream media exceeds the number of streams available to the user from the subscription service, because it is more likely that there are already enough streams in the user's subscription to avoid most streaming conflicts.

In some embodiments, control circuitry 304 may store a plurality of thresholds in association with the number of streams available to the user from the subscription service in storage 308. For example, control circuitry 304 analyzes how frequently conflicts (e.g., the number of instances in which the number of requests to simultaneously stream media from the subscription service exceeds the number of streams available to the user from the subscription service) occur for each number of streams that can potentially be made available to the user. For example, control circuitry 304 determines the average number of conflicts occurring when only one stream is available to the user, when two streams are available, etc. Control circuitry 304 may further correlate the average number of conflicts occurring for each number of available streams with instances in which users performed an action related to his or her subscription. For example, control circuitry 304 determines that users frequently add new streams to his or her subscriptions when there is only one stream available (e.g., situations in which users can stream media to only one device, thus users acted to avoid future streaming conflicts by increasing the number of streams available). In another example, control circuitry 304 determines that a user cancelled his or her subscription around a time in which a certain number of conflicts occurred (e.g., situations in which certain users were frustrated with streaming conflicts, and thus acted to cancel his or her subscriptions). Control circuitry 304 may perform a statistical analysis on those instances in which an action performed on a subscription is correlated with a number of available streams, in order to determine threshold numbers to associate with a subscription period length. Control circuitry 304 may then save the threshold number in a record associated with the subscription in storage 308.

In some embodiments, control circuitry 304 may compare each of the plurality of timestamps to a range of timestamps that corresponds to a portion of the subscription period for the subscription service to determine a number of the plurality of instances that occurred during the portion of the subscription period. For example, control circuitry 304 compares each of the timestamps to a range of timestamps that corresponds to a portion of the subscription period in which popular shows are broadcast (e.g., all portions of the subscription period which correspond to Wednesday 7:00 PM to 9:00 PM timeslots, which may correspond to airing of new episodes of the show "The Simpsons") and determine the occurrence of ten timestamps within the range of timestamps corresponding to the portion of the subscription period.

In some embodiments, control circuitry 304 may determine a portion of the subscription period by identifying times during a day, week, or month during which users frequently stream media. For example, control circuitry 304 identifies portions of the subscription period based on identifying the times of the week that correspond to a certain percentage (e.g., 75%) of the total stream consumption by analyzing data stored in a log in storage 308. For example, control circuitry 304 determines that 75% of all media streaming during the subscription period occurred between 6:00 PM and 12:00 PM (e.g., after users returned from work or school). Control circuitry 304 then defines the portion of the subscription period to include only the time ranges defined by 6:00 PM and 12:00 PM on each day.

Furthermore, control circuitry 304 may compare, at the server, the number of the plurality of instances that occurred during the portion of the subscription period to a threshold number for the portion of the subscription period. For example, control circuitry 304 compares the number of the plurality of instances that occurred during the portion of the subscription period (e.g., eight) to a threshold number (e.g., six).

In some embodiments, control circuitry 304 may modify the message transmitted from the server to one of the different devices, in response to determining that the number of the plurality of instances that occurred during the portion of the subscription period exceeds the threshold number for the portion of the subscription period. For example, control circuitry 304 determines that the number of the plurality of instances that occurred during the portion of the subscription period (e.g., eight) exceeds the threshold number (e.g., six). In response, control circuitry 304 modifies the message transmitted from the server to one of the devices, by indicating, for example, that the number of requests to simultaneously stream media often exceeds the number of streams available to the user from the subscription service during the corresponding portion of the subscription period (e.g., during Wednesday timeslots between 7:00 PM and 9:00 PM, which may correspond to airing of new episodes of the show "The Simpsons"). For example, control circuitry 304 generates a message such as "Today, please consider viewing a program before 7 PM, because other users associated with your subscription will probably watch the new The Simpsons episode." Alternatively, control circuitry 304 may generate a message indicating that an additional stream may be purchased in response to determining that the number of the plurality of instances that occurred during the portion of the subscription period (e.g., eight) exceeds the threshold number (e.g., six). For example, control circuitry 304 generates a message such as "Your subscription doesn't seem to support your viewing habits. Would you like to find out how to increase the number of streams in your subscription?"

In some embodiments, control circuitry 304 may select the threshold number for the portion of the subscription period from a plurality of potential threshold numbers based on a length of time of the subscription period. For example, as described above in relation to selecting the threshold number for the subscription period from a plurality of potential threshold numbers based on a length of time of the subscription period, control circuitry 304 may apply analogous principles to select the threshold number for the portion of the subscription period.

In some embodiments, control circuitry 304 may select the threshold number for the portion of the subscription period from a plurality of potential threshold numbers based on a date corresponding to the portion of the subscription period. For example, control circuitry 304 determines, by sending a query via communication network 414 to content aggregator 430, that the season premier of a popular television show (e.g., "The Simpsons") falls within the portion of the subscription period. Control circuitry 304 may, in response, select a low threshold number for the portion of the subscription period, so as to account for the fact that a majority of the users of the subscription may be interested in viewing the episodes of the season of the popular television show (e.g., "The Simpsons"). In this manner, users may be more likely to be informed about streaming conflicts, at the time when users are more likely to care about streaming conflicts. In another example, control circuitry 304 determines that dates corresponding to the summer months (e.g., June, July, and August) occur within the portion of the subscription period. Summer months are usually associated with fewer new television shows being broadcast. Additionally, users with kids are more likely to spend less time streaming media, as such users may instead spend more time on vacations and being outside as compared to months of other seasons. Thus, during summer months, users may be less frustrated by streaming conflicts, and streaming conflicts may also be less likely to occur. Accordingly, control circuitry 304 may set a high threshold for the portion of the subscription period from a plurality of potential threshold numbers based on a date corresponding to the portion of the subscription period that falls within the months of June, July or August. In this way, users may receive fewer, if any, messages during months in which users may be streaming media less frequently.

In some embodiments, control circuitry 304 may select the threshold number for the portion of the subscription period from a plurality of potential threshold numbers based on a time of day corresponding to the portion of the subscription period. For example, control circuitry 304 monitors users' viewing history by accessing a profile associated with the subscription. In one example, control circuitry 304 queries user history stored in subscription data on user television equipment 402, user computer equipment 404, or wireless user communications device 406. In a different example, control circuitry 304 queries user history on storage 308 of media guidance data source. Control circuitry 304 determines a time during which users are most likely to stream media by analyzing the user history. In one example, control circuitry 304 determines that most users stream media during the evening (e.g., after they return from work or school). Control circuitry 304 may select a low threshold number for times during which users are most likely to stream media, in order to help users understand his or her viewing habits and streaming needs. For example, in response to determining that the portion of the subscription period (e.g., timeslots between 8:00 PM and 10:00 PM during a given day) corresponds to a time when users of the subscription are most likely to stream media, control circuitry 304 selects a low threshold number (e.g., to account for the fact that streaming conflicts are more likely to occur after users return from work and school).

In some embodiments, control circuitry 304 may select the threshold number for the portion of the subscription period from a plurality of potential threshold numbers based a number of media assets that became available from the subscription service during the portion of the subscription period. For example, some subscription services improve their content offerings by regularly adding new media assets. Should this occur, users may become interested in streaming more media than they had before the new media assets became available. Thus, more streaming conflicts are likely to occur. Control circuitry 304 may determine the number of media assets that became available from the subscription service during the portion of the subscription period based on the number of media assets that were added to the subscription service media offerings during a portion of the subscription period. Control circuitry 304 may determine the number of media assets that became available from the subscription service during the portion of the subscription period by sending a query, over communications network 404, to content aggregator 430. Such a query may request the number of media assets that were added to the offering of the subscription service during the time period corresponding to the portion of the subscription period. For example, if number of media assets that became available from the subscription service during the portion of the subscription period is high as compared to the number of media assets that became available from the subscription service during other portions of the subscription period, control circuitry 304 sets a low threshold number, so as to account for the fact that users of the subscription are more likely to stream media assets that haven't been streamed before (e.g., because they have been recently added), and thus may be more likely to want to understand how frequently the number of requests exceeds the number of streams available to the user from the subscription service.

In some embodiments, control circuitry 304 may transmit a message which includes recommendations for reducing a frequency of the plurality of instances. For example, upon determining that the number of the plurality of instances that occurred during the subscription period exceeds the threshold number for the subscription period, control circuitry 304 transmits a message from the server to one of the different devices. The message may include recommendation for reducing the frequency of the plurality of instances. For example, control circuitry 304 informs the user that the user will be more likely to successfully stream media outside of a certain time (e.g., outside of the 7:00 PM and 9:00 PM Wednesday timeslot, which may correspond to airing of new episodes of the show "The Simpsons" which users are interested in streaming). The message may include information that may be useful when informing the user about streaming conflicts. For example, such information includes names of media asset, names of users, number of streaming conflicts occurring during a subscription period, instructions for increasing or decreasing the number of streams in the subscription, and recommendations of how to minimize the number of streaming conflicts in the future.

Figure 5:
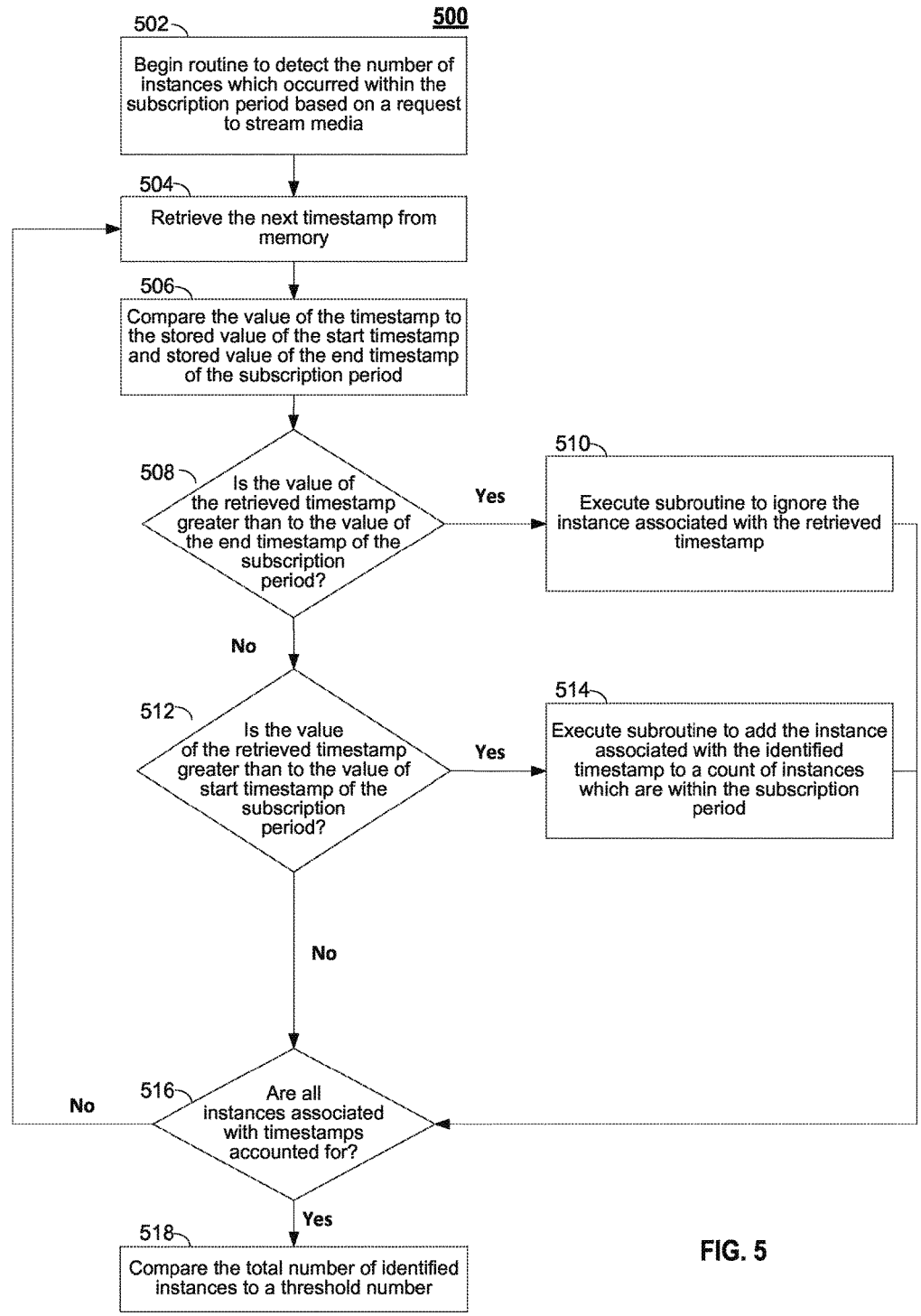
FIG. 5 is a flowchart of illustrative steps for determining a number of instances in a subscription period, in accordance with some embodiments of the disclosure.

FIGS. 5 and 6 present an algorithm for control circuitry (e.g., control circuitry 304) to detect a number of instances in which the number of instances to simultaneously stream media from a subscription service to different devices exceeds the number of available streams during a subscription period, and for transmitting a message to one of the devices when the number of instances exceeds a certain number, in accordance with some embodiments of the disclosure. In some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to determine the number of instances which occurred within the subscription period, in accordance with some embodiments of the disclosure.

At step 502, the algorithm to detect a number of instances which occurred within the subscription period, in which the number of requests to simultaneously stream media from a subscription service to different devices exceeds the number of available streams will begin, based on a request to stream media. In some embodiments, this may be done either directly or indirectly in response to a user action or input (e.g., from signals received by control circuitry 304 or user input interface 310). For example, the algorithm begins directly in response to control circuitry 304 receiving signals from user input interface 310, or control circuitry 304 prompts the user to confirm their input using a display (e.g., by generating a prompt to be displayed on display 312) prior to running the algorithm.

At step 504, control circuitry 304 proceeds to retrieve the next instance of the timestamp from stored memory. In some embodiments control circuitry 304 may receive a single primitive data structure that represents the value of the timestamp. In some embodiments the value may be stored as part of a larger data structure, and control circuitry 304 may retrieve the value by executing appropriate accessor methods to retrieve the value from the larger data structure.

At step 506, control circuitry 304 proceeds to compare the value of the retrieved timestamp to the stored value of the start timestamp and stored value of the end timestamp associated with the subscription period. In some embodiments, the value of the start timestamp and stored value of the end timestamp associated with the subscription period may be stored (e.g., on storage device 308) prior to beginning the algorithm. In some embodiments the value of the start timestamp and value of the end timestamp associated with the subscription may also be retrieved for each and every instance of retrieved timestamp, and the values of the start timestamp and end timestamp associated with the subscription may change from iteration to iteration. In some embodiments, control circuitry 304 may directly compare the value of the start timestamp and stored value of the end timestamp associated with the subscription with the value of the retrieved timestamp by accessing the values respectively from memory and performing a value comparison. In some instances, control circuitry 304 may call a comparison function (e.g., for object to object comparison) to compare retrieved timestamp and the start timestamp and stored value of the end timestamp associated with the subscription.

At step 508, control circuitry 304 compares the values of the retrieved timestamp and the stored value of the end timestamp associated with the subscription to determine if the value of the retrieved timestamp is greater than the value of the end timestamp associated with the subscription. If the condition is satisfied, the algorithm may proceed to step 510; if the condition is not satisfied, the algorithm may proceed to step 512 instead.

At step 510, control circuitry 304 will execute a subroutine to ignore the instance associated with the retrieved timestamp based on the condition at step 508 being satisfied. After the subroutine is executed, the algorithm may proceed to step 516 where it is determined whether all instances of the retrieved timestamp are accounted for and further iterations are needed.

At step 512, control circuitry 304 compares the values of the retrieved timestamp and start timestamp to determine if the value of the retrieved timestamp is greater than the value of the start timestamp. If the condition is satisfied, the algorithm may proceed to step 514; if the condition is not satisfied, the algorithm may proceed to step 516 instead.

At step 514, control circuitry 304 will execute a subroutine to add the instance associated with the identified timestamp to a count of instances which are within the subscription period based on the condition of step 512 being satisfied. After the subroutine is executed, the algorithm may proceed to step 516 where it is determined whether all instances of the timestamps are accounted for and if further iterations are needed.

At step 516, control circuitry 304 will check if all instances of the timestamp are accounted for. If all of the instances have been evaluated, control circuitry 304 may proceed to step 518. For example, control circuitry 304 may call a function to see if there is a next element of the timestamp. If the function returns true (i.e., there are still instances that need to be processed), control circuitry 304 may proceed to step 504.

At step 518, control circuitry 304 will execute a subroutine to compare the total number of identified instances to a threshold number.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several instances of timestamp may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to detect a number of instances, which occurred within the subscription period, in which the number of requests to simultaneously stream media from a subscription service to different devices exceeds the number of available streams, which will begin based on a request to stream media, in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, the algorithm may run a subroutine to initialize variables and prepare to determine the number of instances which occurred within the subscription period, which begins on line 605. For example, in some embodiments control circuitry 304 may copy instructions from non-transitory storage medium (e.g., storage device 308) into RAM or into the cache for processing circuitry 306 during the initialization stage. Additionally, in some embodiments the value of stored subscription period start timestamp and value of stored subscription period end-time being used for comparison, may be retrieved, set, and stored at 601.

At line 605, control circuitry 304 may receive instances of the timestamps. In some embodiments these instances may be retrieved from stored memory. Control circuitry 304 receives instances of the timestamp by receiving, for example, a pointer to an array of values of the timestamp. In another example, control circuitry 304 receives an object of a class, such as an iterator object containing elements of the timestamp.

At line 606, control circuitry 304 may iterate through the various instances of the timestamps, if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 will store the value of the timestamp into a temporary variable "A." In some embodiments the value of the timestamp will be stored as part of a larger data structure or class, and the value of the timestamp may be obtained through appropriate accessor methods. In some embodiments the timestamp may be converted from a string or other non-numeric data type into a numeric data type by means of an appropriate hashing algorithm. In some embodiments, control circuitry 304 may call a function to perform a comparison of the retrieved timestamp to the subscription period start time. In some embodiments the timestamp may be encoded as a primitive data structure, and rather than using a temporary variable, the retrieved timestamp may be directly used in the comparisons at lines 610 and 612.

At line 608, control circuitry 304 will store the value of the subscription period start timestamp into a temporary variable "B." Similar to the timestamp, in some embodiments the value of the subscription period start timestamp will be stored as part of a larger data structure or class, and the value of subscription period start timestamp may be obtained through accessor methods. In some embodiments the subscription period start timestamp may be converted from a string or other non-numeric data type into a numeric data type by means of an appropriate hashing algorithm, or subscription period start timestamp may be a primitive data structure, and may be directly used in the comparisons at line 612.

At line 609, control circuitry 304 will store the value of the subscription period end-time into a temporary variable "C." Similar to the start timestamp, in some embodiments the value of the subscription period end timestamp will be stored as part of a larger data structure or class, and the value of the subscription period end timestamp may be obtained through accessor methods. In some embodiments the subscription period end timestamp may be converted from a string or other non-numeric data type into a numeric data type by means of an appropriate hashing algorithm, or subscription period end timestamp may be a primitive data structure, and may be directly used in the comparisons at line 610.

At line 610, control circuitry 304 will compare the value of A and C to determine if A is greater than C.

At line 611, control circuitry 304 will execute a subroutine to ignore the instance associated with the retrieved timestamp control circuitry if the condition in line 610 is satisfied.

At line 612, control circuitry 304 will compare the value of A and B to determine if A is greater than B.

At line 613, control circuitry 304 will execute a subroutine to add the instance associated with the identified timestamp to a count of instances which are within the subscription period if the condition in line 612 is satisfied.

At line 615, control circuitry 304 will execute a subroutine to determine whether all instances associated with timestamps are accounted for using control circuitry 304, if neither of the conditions at lines 610 or 612 are satisfied.

At line 617, control circuitry 304 may run a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch. In some embodiments, rather than iterating over all instances of the timestamp at step 606, in some embodiments the code may be rewritten so control circuitry 304 is instructed to evaluate multiple instances of the timestamp simultaneously on a plurality of processors or processor threads, lowering the number of iterations needed and potentially speeding up computation time.

Figure 7:
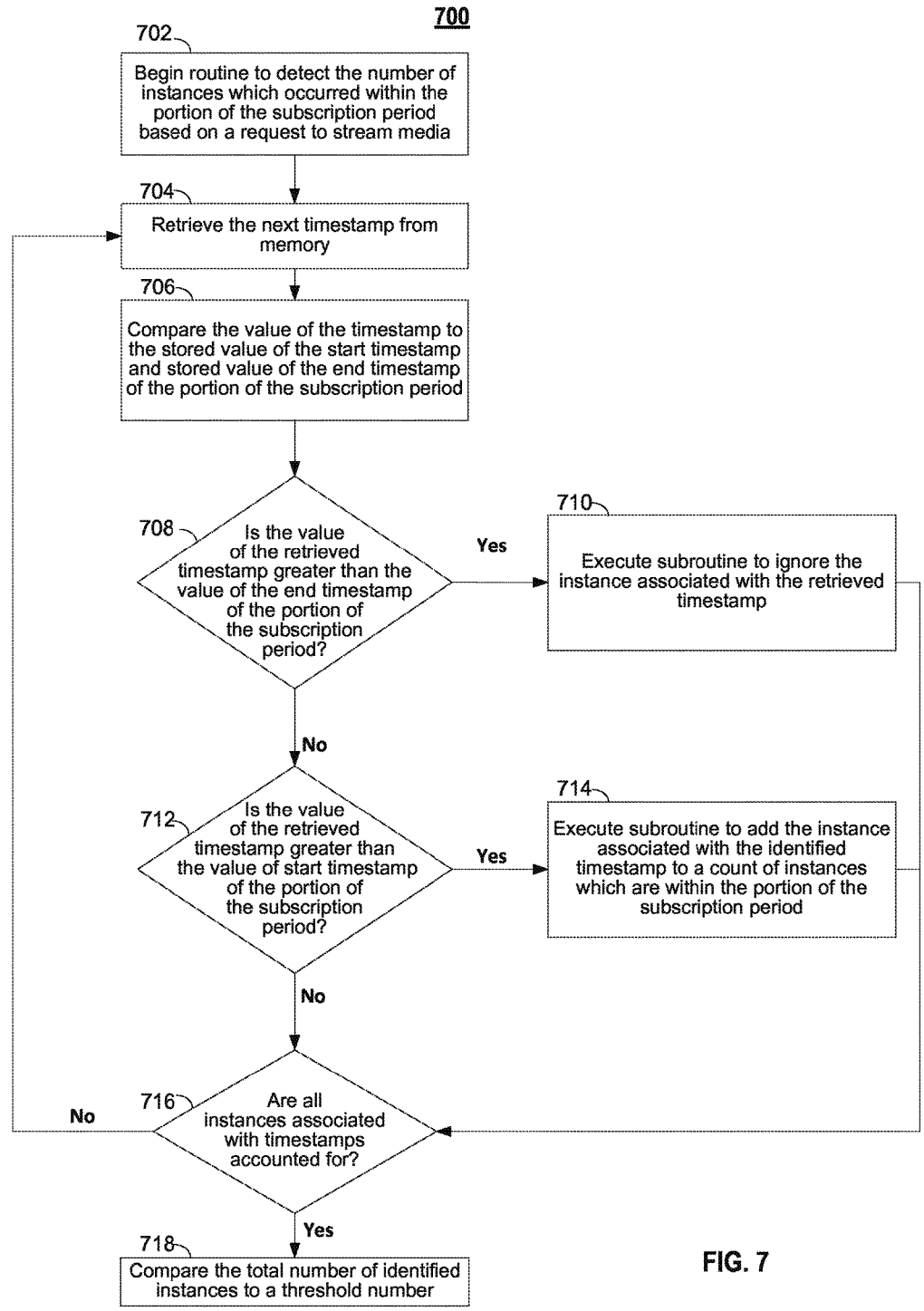
FIG. 7 is a flowchart of illustrative steps for determining a number of instances in a portion of a subscription period, in accordance with some embodiments of the disclosure.

FIGS. 7 and 8 present an algorithm for control circuitry (e.g., control circuitry 304) to detect a number of instances in which the number of instances to simultaneously stream media from a subscription service to different devices exceeds the number of available streams during a portion of a subscription period, and for transmitting a message to one of the devices when the number of instances exceeds a certain number, in accordance with some embodiments of the disclosure. In some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to determine the number of instances which occurred during a portion of the subscription period, in accordance with some embodiments of the disclosure.

At step 702, the algorithm to detect a number of instances which occurred within a portion of a subscription period, in which the number of requests to simultaneously stream media from a subscription service to different devices exceeded the number of available streams, will begin, based on a request to stream media. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm his or her input using a display (e.g., by generating a prompt to be displayed on display 312) prior to running the algorithm.

At step 704, control circuitry 304 proceeds to retrieve the next instance of the timestamp from stored memory. In some embodiments control circuitry 304 may receive a single primitive data structure that represents the value of the timestamp. In some embodiments the value may be stored as part of a larger data structure, and control circuitry 304 may retrieve the value by executing appropriate accessor methods to retrieve the value from the larger data structure.

At step 706, control circuitry 304 proceeds to compare the value of the retrieved timestamp to the stored value of the start timestamp and stored value of the end timestamp associated with a portion of the subscription period. In some embodiments, the value of the start timestamp and stored value of the end timestamp associated with the portion of the subscription period may be stored (e.g., on storage device 308) prior to beginning the algorithm. In some embodiments the value of the start timestamp and value of the end timestamp associated with the portion of the subscription may also be retrieved for each and every instance of retrieved timestamp, and the values of the start timestamp and end timestamp associated with the portion of the subscription period may change from iteration to iteration. In some embodiments, control circuitry 304 may directly compare the value of the start timestamp and the stored value of the end timestamp associated with the portion of the subscription with the value of the retrieved timestamp by accessing the values respectively from memory and performing a value comparison. In some instances, control circuitry 304 may call a comparison function (e.g., for object-to-object comparison) to compare the retrieved timestamp and the start timestamp and the stored value of the end timestamp associated with the portion of the subscription period.

At step 708, control circuitry 304 compares the values of the retrieved timestamp and the end timestamp associated with the portion of the subscription period to determine if the value of the retrieved timestamp is greater than the value of the end timestamp associated with the portion of the subscription. If the condition is satisfied, the algorithm may proceed to step 710; if the condition is not satisfied, the algorithm may proceed to step 712 instead.

At step 710, control circuitry 304 will execute a subroutine to ignore the instance associated with the retrieved timestamp based on the condition at step 708 being satisfied. After the subroutine is executed, the algorithm may proceed to step 716 where it is determined whether all instances of the retrieved timestamp are accounted for and further iterations are needed.

At step 712, control circuitry 304 compares the values of the retrieved timestamp and the start timestamp to determine if the value of the retrieved timestamp is greater than the value of the start timestamp. If the condition is satisfied, the algorithm may proceed to step 714; if the condition is not satisfied, the algorithm may proceed to step 716 instead.

At step 714, control circuitry 304 will execute a subroutine to add the instance associated with the identified timestamp to a count of instances which are within the portion of the subscription period based on the condition of step 712 being satisfied. After the subroutine is executed, the algorithm may proceed to step 716 where it is determined whether all instances of timestamps are accounted for and whether further iterations are needed.

At step 716, control circuitry 304 will check whether all instances of the timestamp are accounted for. If all of the instances have been evaluated, control circuitry 304 may proceed to step 718. For example, control circuitry 304 may call a function to see if there is a next element of the timestamp. If the function returns true (i.e., there are still instances that need to be processed), control circuitry 304 may proceed to step 704.

At step 718, control circuitry 304 will execute a subroutine to compare the total number of identified instances to a threshold number.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations, such as those at 708 and 712, may be performed in any order or in parallel or simultaneously to reduce lag or increase the speed of the system or method. As a further example, in some embodiments several instances of timestamp may be evaluated in parallel, using multiple logical processor threads, or the algorithm may be enhanced by incorporating branch prediction. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to detect a number of instances, which occurred within the portion of the subscription period, in which the number of requests to simultaneously stream media from a subscription service to different devices exceeds the number of available streams, which will begin based on a request to stream media, in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the algorithm may run a subroutine to initialize variables and prepare to determine the number of instances which occurred within the portion of the subscription period, which begins on line 805. For example, in some embodiments control circuitry 304 may copy instructions from non-transitory storage medium (e.g., storage device 308) into RAM or into the cache for processing circuitry 306 during the initialization stage. Additionally, in some embodiments the value of stored start-time of the portion of the subscription period and value of the stored end-time of the portion of the subscription period being used for comparison, may be retrieved, set, and stored at 801.

At line 805, control circuitry 304 may receive instances of the timestamp. In some embodiments these instances may be retrieved from stored memory. Control circuitry 304 may receive instances of the timestamp by receiving, for example, a pointer to an array of values of the timestamp. In another example, control circuitry 304 may receive an object of a class, such as an iterator object containing elements of the timestamp.

At line 806, control circuitry 304 may iterate through the various instances of the timestamp, if only a single instance is available, the loop will only execute once. This loop may be implemented in multiple fashions depending on the choice of hardware and software language used to implement the algorithm of FIG. 8; for example, this may be implemented as part of a "for" or "while" loop.

At line 807, control circuitry 304 will store the value of the timestamp into a temporary variable "A." In some embodiments the value of the timestamp will be stored as part of a larger data structure or class, and the value of the timestamp may be obtained through appropriate accessor methods. In some embodiments the timestamp may be converted from a string or other non-numeric data type into a numeric data type by means of an appropriate hashing algorithm. In some embodiments, control circuitry 304 may call a function to perform a comparison of the retrieved timestamp to the start time of the portion of the subscription period. In some embodiments the timestamp may be encoded as a primitive data structure, and rather than using a temporary variable, the retrieved timestamp may be directly used in the comparisons at lines 810 and 812.

At line 808, control circuitry 304 will store the value of the start time of the portion of the subscription period into a temporary variable "B." Similar to the timestamp, in some embodiments the value of the start time of the portion of the subscription period timestamp will be stored as part of a larger data structure or class, and the value of the subscription period start timestamp may be obtained through accessor methods. In some embodiments the start timestamp of the portion of the subscription period may be converted from a string or other non-numeric data type into a numeric data type by means of an appropriate hashing algorithm, or the start timestamp of the portion of the subscription period may be a primitive data structure, and may be directly used in the comparisons at line 812.

At line 809, control circuitry 304 will store the value of the end timestamp of the portion of the subscription period into a temporary variable "C." Similar to the start timestamp, in some embodiments the value of subscription period end timestamp will be stored as part of a larger data structure or class, and the value of the end timestamp of the portion of the subscription period may be obtained through accessor methods. In some embodiments the end timestamp of the portion of the subscription period may be converted from a string or other non-numeric data type into a numeric data type by means of an appropriate hashing algorithm, or the end timestamp of the portion of the subscription period may be a primitive data structure and may be directly used in the comparisons at line 810.

At line 810, control circuitry 304 will compare the value of A and C to determine if A is greater than C.

At line 811, control circuitry 304 will execute a subroutine to ignore the instance associated with the retrieved timestamp control circuitry if the condition in line 810 is satisfied.

At line 812, control circuitry 304 will compare the value of A and B to determine whether A is greater than B.

At line 813, control circuitry 304 will execute a subroutine to add the instance associated with the identified timestamp to a count of instances which are within the subscription period portion if the condition in line 812 is satisfied.

At line 814, control circuitry 304 will determine whether neither condition in line 810 or 812 is satisfied. If neither condition is satisfied, then the instruction at line 815 may be evaluated and executed.

At line 817, control circuitry 304 may run a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 810 and 812 to speed operation, or the conditional statements may be replaced with a case-switch. In some embodiments, rather than iterating over all instances of the timestamp at step 806, in some embodiments the code may be rewritten so control circuitry 304 is instructed to evaluate multiple instances of the timestamp simultaneously on a plurality of processors or processor threads, lowering the number of iterations needed and potentially speeding up computation time.

Figure 9:
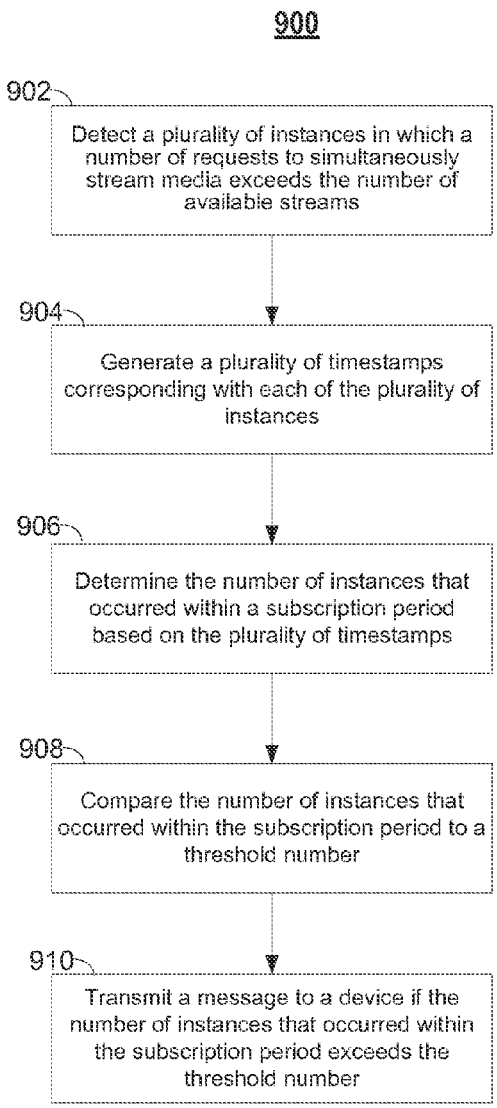
FIG. 9 is a flowchart of illustrative steps involved in transmitting a message to a device when the number of instances exceeds a certain number, in accordance with some embodiments of the disclosure.

FIG. 9 is a flowchart of illustrative steps involved in transmitting a message to a device when the number of instances exceeds a certain number. It should be noted that process 900 or any step thereof could be performed on, or provided by, any of the devices shown in FIGS. 3-4. For example, process 900 may be executed by control circuitry 304 (FIG. 3) as instructed by control circuitry implemented on user equipment 402, 404, and/or 406 (FIG. 4) in order to detect when the number of instances exceeds a certain number, and to transmit a message to a device. In addition, one or more steps of process 900 may be incorporated into or combined with one or more steps of any other process or embodiment.

Process 900 begins at step 902, where control circuitry 304 detects a plurality of instances in which a number of requests to simultaneously stream media from the subscription service to different devices exceeds the number of streams available to the user from the subscription service. Control circuitry 304 receives requests from various devices used by users accessing the subscription service. These devices may include user television equipment 402, user computer equipment 404, and wireless user communications devices 406. In one example, control circuitry 304 detects that in twelve instances, the number of requests to simultaneously stream media from the subscription service to different devices exceeds the number of streams available to the user from the subscription service. In other words, on twelve occasions, at least one user of the subscription was unable to stream content from the content subscription service.

At step 904, control circuitry 304 generates a plurality of timestamps corresponding with each of the plurality of instances. For example, based on detecting a number of instances in which the number of requests to simultaneously stream media from the subscription service to different devices exceeds the number of streams available to the user from the subscription service, control circuitry 304 stores a timestamp associated with each instance in a list in storage 308. Should control circuitry 304 detect, for example, twelve instances in which the number of requests to simultaneously stream media from the subscription service to different devices exceeds the number of streams available to the user from the subscription service, control circuitry 304 generates and stores in storage 308 a list of timestamps, where each timestamp corresponds to one of the twelve instances.

At step 906, control circuitry 304 determines the number of instances that occurred within a subscription period based on timestamps, by comparing each of the plurality of timestamps to a range of timestamps that corresponds to a subscription period for the subscription service to determine a number of the plurality of instances that occurred during the subscription period. For example, if control circuitry 304 generates twelve timestamps, control circuitry 304 then compares each of the twelve timestamps with the subscription period for the subscription service. Control circuitry 304 then compares each of the twelve timestamps to determine whether each timestamp falls within the range of time defined by the start and end timestamps of the subscription period. Based on the number of timestamps that fall within the range, control circuitry 304 determines the number of the plurality of instances that occurred during the subscription period. For example, control circuitry 304 determines that out of the twelve generated timestamps, nine fall within the range of time defined by the start and end timestamps of the subscription period.

At step 908, control circuitry 304 compares the number of the plurality of instances that occurred during the subscription period to a threshold number for the subscription period. Control circuitry 304 utilizes different approaches to determine a threshold number for the subscription period. For example, control circuitry 304 bases the threshold number on the number of streams available to the user from the subscription service. For example, control circuitry 304 may target users who are consistently dealing with unavailable streams. To that end, control circuitry 304 sets a threshold number to a higher number (e.g., twenty), should control circuitry 304 determine that the number of streams available to the user from the subscription service (e.g., nine streams) is higher than an average number of streams available to an average user of the subscription service (e.g., an average user may be associated with only two streams).

At step 910, control circuitry 304 transmits a message to a device if the number of instances that occurred within the subscription period exceeds the threshold number. For example, control circuitry 304 transmits a message, from the server to one of the different devices via network via communications network 414, in response to determining that the number of the plurality of instances that occurred during the subscription period exceeds the threshold number for the subscription period. For example, in response to determining that the number of the plurality of instances that occurred during the subscription period (e.g., twelve) exceeds the threshold number (e.g., eight), control circuitry 304 transmits a message from the server to a device, indicating that a user associated with the device can purchase additional streams. In one example, control circuitry 304 generates the message to indicate that the user is able to buy additional streams due to frequent streaming conflicts. Control circuitry 304 transmits the message for display on display 312 of user television equipment 402, user computer equipment 404, or wireless communications device 406. For example, control circuitry 304 generates the message for display in a program listings display 100 which is displayed on display 312 of user television equipment 402.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For example, detection of a social media interaction associated with a user may be performed by processing circuitry, e.g., by processing circuitry 306 of FIG. 3. The processing circuitry, for example, may be a general purpose processor, a customized integrated circuit (e.g., an ASIC), or a field-programmable gate array (FPGA) within equipment device 300, media content provider 416, or content aggregator 430. For example, the media asset metadata as described herein may be stored in, and retrieved from, storage 308 of FIG. 3, or content aggregator 430 of FIG. 4. Furthermore, processing circuitry, or a computer program, may update settings associated with a user, such as user profile attributes, updating the information stored within storage 308 of FIG. 3 or content aggregator 430 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

In some embodiments, control circuitry 304 may automatically receive authentication information from a content aggregator service. For example, the media guidance application, implemented on control circuitry 304, may receive authentication information and associate the authentication information with a user account, prior to control circuitry 304 receiving a request to subscribe the user to the subscription service. Control circuitry 304 may then receive a request to subscribe the user to the subscription service, and thus validate the account and grant access to the subscription service's offerings to the user.

In some aspects, control circuitry 304 may receive, at a content provider server that is associated with a subscription service (e.g., Hulu), a first authentication key from a content aggregator server that is associated with a second subscription service (e.g., Rovi Super Aggregator), where the first authentication key is received prior to a user subscribing to the first subscription service. For example, a user may subscribe to a content aggregator service (i.e., the second subscription service). Once the user completes his or her registration with the second subscription service, control circuitry 304 implemented on the content aggregator server associated with the second subscription service may generate authentication keys to associate the user with some or all of the subscription services that are available as part of the content aggregator subscription, and transfer the generated authentication keys to servers associated with each subscription service, including the first subscription service. Each authentication key may be encoded in order to ensure that the information stored in the key is transmitted securely to the servers associated with each subscription service. Additionally, each authentication key may include information identifying the user and the second subscription service (e.g., Rovi Super Aggregator). Control circuitry 304 implemented on the content provider server associated with the first subscription service may then receive the generated authentication key from the content aggregator server. In some instances, control circuitry 304 implemented on the content provider server may decode the authentication key and extract information stored in the key. Control circuitry 304 may additionally store the authentication key on the content provider server. In such a way, control circuitry 304 may transmit the authentication information associated with the first user to the first subscription service without burdening the user with the task of manually creating accounts.

In some instances, control circuitry 304 implemented on the content provider server may receive the first authentication key from the content aggregator server after the user is registered with the second subscription service, but before control circuitry 304 implemented on the content aggregator server detects that the user wishes to subscribe to the first subscription service. For example, the entity offering the second subscription service (e.g., Rovi Super Aggregator) may come to an agreement with the entity providing the first subscription service (e.g., Hulu) to offer, at a discount, a subscription to the first subscription service to users of the second subscription service. Prior to the user subscribing to the first subscription service, control circuitry 304 implemented on the content aggregator server may transmit a first authentication key to the content aggregator server.

In some instances, control circuitry 304 implemented on the content aggregator server associated with the second subscription service may generate authentication keys to associate the user with some or all of the subscription services that are available as part of the content aggregator subscription, and transfer the generated authentication keys to servers associated with each subscription service, including the first subscription service. Each authentication key may be encrypted in order to ensure that the information stored in the key is transmitted securely to the server associated with each subscription service. For example, an authentication key may be encrypted by way of a public key, which may be accessible to both the content provider server and the content aggregator server. Additionally, each authentication key may include information identifying the user and the second subscription service (e.g., Rovi Super Aggregator). In one example, an authentication key may comprise the username and password associated with a user on the second subscription service. Control circuitry 304 implemented on the content provider server associated with the first subscription service may then receive the generated authentication key from the content aggregator server. In some instances, control circuitry 304 implemented on the content provider server may decrypt the authentication key and extract information stored in the key. Control circuitry 304 may additionally store the authentication key on the content provider server. In such a way, control circuitry 304 may transmit the authentication information associated with the first user to the first subscription service without burdening the user with the task of manually creating an account.

In some instances, control circuitry 304 implemented on the content provider server may compare the first authentication key to a first plurality of acceptable authentication keys to determine whether or not to generate a first user account for the first subscription service based on the first authentication key. For example, control circuitry 304 implemented on the content provider server may extract information stored in the first authentication key, and determine the name of the subscription service (e.g., Rovi Super Aggregator) that is listed in the part of the key related to the identifier of the second subscription service. Control circuitry 304 implemented on the content provider server may then retrieve a list of subscription services which control circuitry 304 had previously identified to be permitted to generate accounts on the first subscription service, and compare the name of the subscription service to each subscription service in the retrieved list. In effect, control circuitry 304 implemented on the content provider server can securely receive information about new users from content aggregators (i.e., the second subscription service), while maintaining control over the accounts that are created. For example, a first subscription service may enter into an agreement with a second subscription service to offer subscriptions on the first subscription service at a discounted price. Furthermore, by encapsulating information about the second subscription service in the authentication key, the first subscription service ensures that only accounts of users associated with trusted content aggregators are created.

In some instances, control circuitry 304 implemented on the content provider server may extract information stored in the first authentication key, and determine the username of a user. Control circuitry 304 may then retrieve a list of usernames which control circuitry 304 had previously identified to be permitted to generate accounts on the first subscription service, and compare the extracted username to each identified username.

In some aspects, control circuitry 304 implemented on the content provider server, in response to determining that the first authentication key matches one of the first plurality of acceptable authentication keys, may generate, at the content provider server, the first user account. For example, control circuitry 304 may extract the information contained in the authentication key, such as a username, password, and subscription service name, in order to create the information necessary for generating an account on the content provider server. In some instances, control circuitry 304 may store an indication associated with the first account, specifying that the account is not validated. Should the user or control circuitry 304 implemented on the second subscription service decide to validate the account in the future, control circuitry 304 implemented on the content provider server may efficiently validate the account with little or no required input from the user, as will be explained in further detail below.

In some aspects, control circuitry 304 implemented on the content provider server may store the first user account in a database entry that indicates that the first user account corresponds to the first authentication key. For example, control circuitry 304 implemented on the content provider server may store the information related to the generated user account in an entry stored in a database. Control circuitry 304 may also associate the user account with the authentication key, for example, by storing a pointer to the location of the authentication key in the database entry associated with the user account. By associating the stored user account with the first authentication key, control circuitry 304 implemented on the content aggregator server may ensure that the account is quickly validated in the event that the second subscription or the user decides to validate the account on the first subscription service. In some instances, control circuitry 304 may store the first authentication key in a location in storage 308, where the location is identified by a directory or file path. Control circuitry 304 may then store the path to the location in a database entry corresponding to the first user account.

In some aspects, control circuitry 304 implemented on the content provider server may, subsequent to storing the first user account, receive at the content provider server a request from the content aggregator server to subscribe the user to the first subscription service, wherein the request includes a second authentication key. Control circuitry 304 may receive the second authentication key in response to a user request to subscribe to the first subscription service. For example, control circuitry 304 implemented on the content aggregator server may detect that a user of the second subscription service (e.g., Rovi Super Aggregator) desires to subscribe to the first subscription service (e.g., Hulu). In a different example, control circuitry 304 implemented on the second service may automatically send a request to the first service, when the cost of subscribing to the first service meets a cost criterion. Control circuitry 304 on the first subscription service may decrypt the information stored in the second key, retrieve information stored in the second key, and store the authentication key on the content provider server. By providing a framework to receive the second authentication key, the control circuitry implemented on the content provider server may securely validate an account for the user.

In some aspects, control circuitry 304 implemented on the content provider server may compare the first authentication key to the second authentication key. For example, control circuitry 304 implemented on the content provider server may retrieve information from the second key related to the name of the user associated with the key, and may then query the database to determine whether an account associated with the identified user exists. Optionally, control circuitry 304 may then retrieve the first authentication key (i.e., from storage 308 or from the database) associated with the account of the identified user. Control circuitry 304 may further compare the second authentication key with the first authentication key, with or without decrypting the data stored in the keys.

In some aspects, control circuitry 304 implemented on the content provider server may validate the first user account in response to determining that the first authentication key matches the second authentication key. For example, based on the comparing of the first authentication key to the second authentication key, control circuitry 304 implemented on the content provider server may then identify the user account associated with either key. Control circuitry 304 may then query the database to identify the account and store an indication specifying that the account has been validated. In one example, control circuitry 304 may identify a database record associated with the identified account, and set the field associated with whether the account is validated (e.g., field IS_VALIDATED) to a value (e.g., TRUE) indicating that the account is validated. By validating the account, control circuitry 304 implemented on the content provider server allows a user authenticated by the content provider server to access media content offered by the first subscription service without the user needing to create an account.

In some embodiments, in response to validating the first user account, control circuitry 304 implemented on the first account may grant access to the first subscription service through the first user account. For example, control circuitry 304 implemented on the content provider server may generate and transmit a message to the content aggregator server, indicating that the account is available for use. Thus, control circuitry 304 implemented on the content provider server is able to notify the user that the offerings of the second subscription service may be accessed by the user.

In some aspects, the first authentication key is an encryption key based on a username and password for the user assigned by the second subscription service. For example, the authentication key may include the username and password corresponding to the account of the user on the content aggregator server. In another example, control circuitry 304 on the content aggregator server may generate a password compliant with the password requirements of the first subscription service. Control circuitry 304 implemented on the content aggregator server may utilize a password generation module, which may be designed to generate randomized strings which are difficult to decrypt, ensuring that the authentication information needed for accessing the content provider server is stronger than an average user would normally select. For example, to easily memorize his or her password, an average user may select a short keyword and a number for a password (e.g., "mypetsname1"), if the password requirements for creating an account on the content provider server allow for the password be comprised of only letters and numbers. Meanwhile, control circuitry 304 implemented on the content aggregator server may utilize a password generator module to create a long string of mixed lowercase and uppercase letters, numbers, and special characters. Control circuitry 304 may be pre-configured with password rules to each subscription service. For example, a password rule may indicate that the first subscription service (e.g., Hulu) allows a password of a maximum length of fifteen characters, and that ampersand symbols are not allowed as part of the password. Based on the password rule for the first subscription service (e.g., Hulu), control circuitry 304 may generate a secure password (e.g., "y#E % f4v3Tt$80u") that conforms to the requirements of the first subscription service. In this way, the user's account on the content provider server becomes less susceptible to password hacking attempts. The user's username may be generated in a similar fashion to further increase the security of the user's authentication information on the content provider server.

In some embodiments, the first plurality of acceptable authentication keys is received at the content provider server from the content aggregator server. For example, control circuitry 304 implemented at the content provider server may receive a list of authentication keys from the second subscription service at regular intervals. For example, control circuitry 304 implemented on the content aggregator server may transmit, on a daily basis, authentication keys associated with all new users that have created an account with the second subscription service. In some instances, control circuitry 304 implemented on the content provider server may store the received list of authentication keys in the database for comparing the first authentication key to the plurality of acceptable authentication keys, as previously described.

In some aspects the database entry stored at the content provider server includes a first database field that includes a pointer to the first user account and a second database field that includes the first authentication key. The term "pointer," as used herein, refers to data, the value of which contains an address of another value located in storage. For example, the database entry on the content provider server may include a pointer stored in a first database field that refers to a second database entry containing information about the user's account, such as the user's username, password, and subscription level. The database entry may include a second database field which may contain the first authentication key. For example, the first authentication key may be stored as a value in the second database field, or alternatively, the second database field may include a pointer to the location of the first authentication key.

In some embodiments the database entry stored at the content provider server includes a third database field that includes subscription terms for the first subscription service. The subscription terms may comprise a date range during which a user may access content made available to the user from the subscription service. For example, a user may be subscribed to the first subscription service (e.g., Hulu) from January 1 to March 31. Further, the subscription terms may include information related to how a user may access content, and which content is made available based on a chosen subscription. For example, the subscription terms may specify that a maximum number of four streams may access content through the user's subscription. In another example, the subscription terms may indicate that a user may access all content as part of the "premium" subscription, but must pay a fee to access the newest movies under a "basic" subscription. The terms of the subscription may determine the price of the subscription; the price that the user incurs for subscribing may also be stored in the third database field.

In some embodiments, the request from the content aggregator server to subscribe the user to the first subscription service is transmitted from the content aggregator server without further user input in response to the user selecting a subscription level for the second subscription service at the content aggregator server. For example, when the user enters information as part of registration for the second subscription service (e.g., Rovi Super Aggregator), control circuitry 304 implemented on the content aggregator server may generate two subscription levels: a "standard" level, which may include a subscription to one subscription service, and a "deluxe" level, which may include subscription to two subscription services. If the first subscription is offered only as part of the "deluxe" level subscription, control circuitry 304 implemented on the content aggregator server may transmit a request from the user to the second subscription service only in response to determining that the user has selected the "deluxe" level subscription. In a different example, the user may be already subscribed to the "standard" level of the subscription. Upon learning that the first subscription is only offered as part of the "deluxe" level subscription, the user may decide to upgrade his or her subscription to the "deluxe" level. By transmitting the request from the content aggregator server to the first subscription without further user input, control circuitry 304 implemented on the content aggregator server may quickly provide the user with access to the content offered by the first subscription service with minimum input on the part of the user.

In some embodiments, control circuitry 304 implemented on the content provider server may transmit, from the content provider server, a confirmation to the content aggregator server in response to validating the first user account. For example, once control circuitry 304 validates the user account, control circuitry 304 may transmit a message comprising a confirmation to the content aggregator server. By transmitting the confirmation, the user of the second service may be informed that he or she is able to access the media associated with the first subscription service. In a different example, should control circuitry 304 implemented on the second subscription service be configured to access media content of the first subscription service by way of a connection between the first subscription service and the second subscription service, control circuitry 304 implemented on the second subscription service can be configured to list media of the first subscription service upon receipt of the confirmation.

In some embodiments, control circuitry 304 implemented on the content provider server may receive a second request from the content aggregator server to access media content of the first subscription service through the first user account. Users of a content aggregation service may become frustrated with the task of manually logging in to each content subscription service in order to access content. A direct connection created between a subscription service and the user television equipment 402 may facilitate a streamlined viewing experience for the user. For example, control circuitry 304 implemented on the content provider server may receive a user request, passed from the content aggregator server, to access media content (e.g., an episode of the television show "The Simpsons"). In response to receiving the request from the content aggregator server to access media content of the first subscription service through the first user account, control circuitry 304 implemented on the content aggregator server or on the content provider server may create a direct connection between the content provider server and the user television equipment 402, over communications network 414. The direct connection may reserve a certain amount of bandwidth between the content provider server and user television equipment 402 so that a user request to stream media from the content provider server to the user television equipment 402 is always handled, regardless of the network conditions between the content provider and user television equipment 402. Control circuitry 304 implemented on the content provider server may transfer media content to the user television equipment 402 using the direct connection, without further authentication taking place. Further, by creating a direct connection and transferring media from the content provider server to the content aggregator server, the media content may displayed in the user interface used to access the second subscription service, streamlining the viewing experience for the user.

In some embodiments, control circuitry 304 implemented on the content aggregator server may retrieve a user interface skin associated with the first subscription service in response to the creation of a direct connection between the content provider server and the user television equipment 402. For example, a user interface skin associated with the first subscription service may define the visual appearance of user interface elements, such as background colors, font, and the menu location of a user interface associated with the first subscription service. Additionally, the interface skin may include a logo associated with the first subscription service, which can be displayed at a defined location on the screen, and a color palette associated with the first subscription service, which can define the background color of screen elements. Control circuitry 304 may extract the parameters associated with the user interface skin and apply the parameters to the user interface skin associated with the second subscription service. Control circuitry 304 implemented on the content aggregator server may generate for display media content listings user interface skin associated with the second subscription service. In this way, the first subscription service may be able to control the feel of the content presented using the second subscription service.

In some embodiments, control circuitry 304 implemented on the content provider server may receive from the content aggregator server a user selection through the first user account of a media content listing. For example, control circuitry 304 implemented on the content aggregator server may utilize a connection created between the content provider server and the content aggregator server to retrieve media content listings of content available on the content provider server. Control circuitry 304 implemented on the content aggregator server may then detect a selection of a media content listing made by a user, where the user is associated with the account on the content aggregator server. Once control circuitry 304 implemented on the content aggregator server receives the selection, control circuitry 304 may generate for display the media asset corresponding to the media content listing selected by the user. For example, control circuitry 304 implemented on the user television equipment 402 may retrieve the media asset using the direct connection created between the content provider and user television equipment 402. In one instance, control circuitry 304 implemented on the content provider server may receive the request for media content (e.g., an episode of the television show "The Simpsons"). Control circuitry 304 may begin to stream the media, by transferring portions of the media from the content provider server, using the direct connection, to the user television equipment 402. In a different example, control circuitry 304 implemented on the content provider server may provide a path to the media asset to the control circuitry 304 implemented on the content aggregator server. In response, the control circuitry 304 implemented on the content aggregator server may access the file referenced in the path and download the media file to the content aggregator server, or alternatively, to the user television equipment 402, user computer equipment 404, or wireless user communications device 406.

Figure 10:
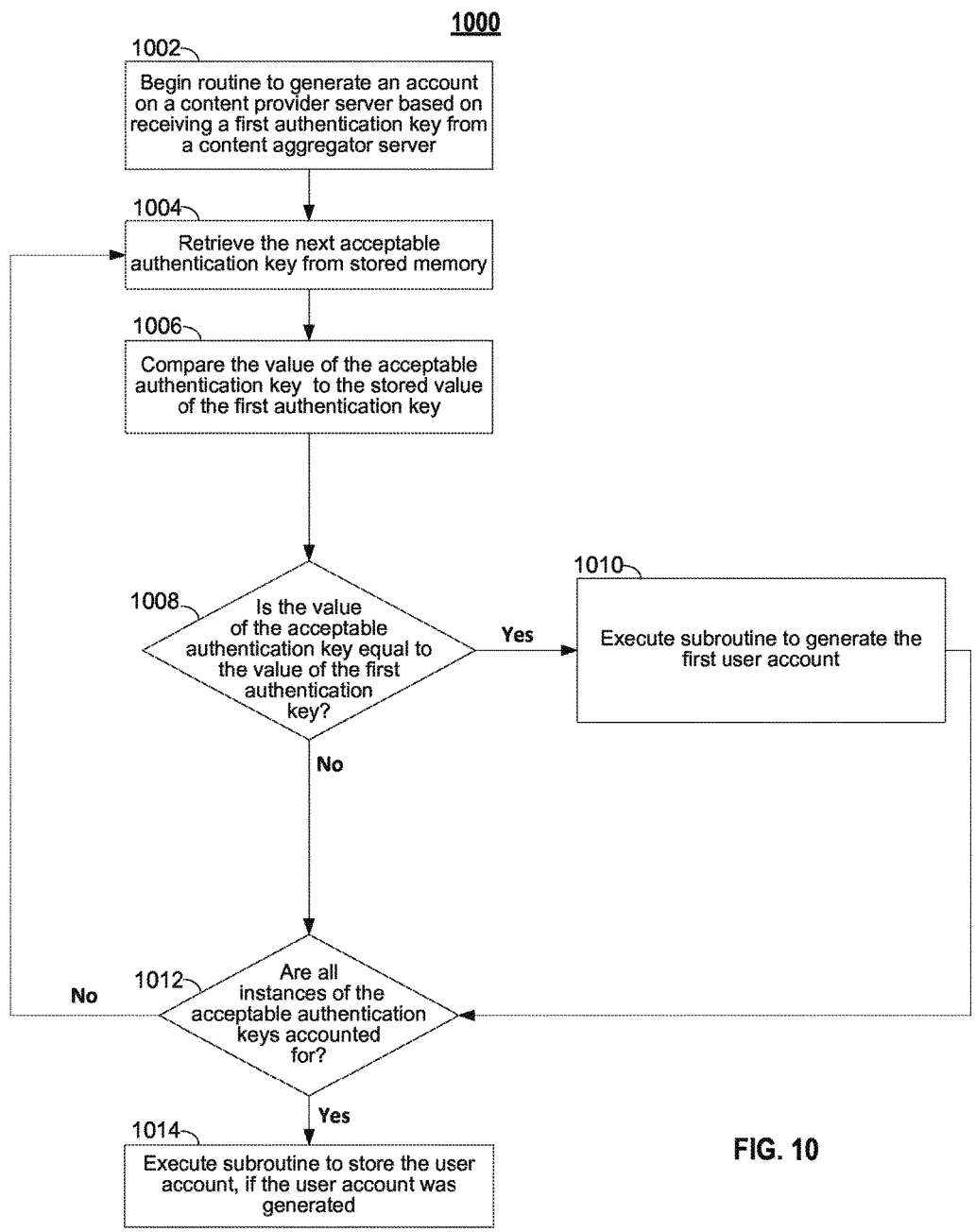
FIG. 10 is a flowchart of illustrative steps for generating an account on a content provider server based on receiving a first authentication key from a content aggregator server, in accordance with some embodiments of the disclosure.

FIGS. 10 and 11 present an algorithm for control circuitry (e.g., control circuitry 304) to generate a user account on a content provider server associated with a first subscription service, prior to the user subscribing to the first service, in accordance with some embodiments of the disclosure. In some embodiments this algorithm may be encoded onto non-transitory storage medium (e.g., storage device 308) as a set of instructions to be decoded and executed by processing circuitry (e.g., processing circuitry 306). Processing circuitry may in turn provide instructions to other subcircuits contained within control circuitry 304, such as the tuning, video generating, encoding, decoding, encrypting, decrypting, scaling, analog/digital conversion circuitry, and the like.

The flowchart in FIG. 10 describes an algorithm for control circuitry (e.g., control circuitry 304) to generate an account on a content provider server based on receiving a first authentication key from a content aggregator server, in accordance with some embodiments of the disclosure.

At step 1002, the algorithm to generate an account on the content provider server will begin based on receiving a first authentication key from a content aggregator server. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm his or her input using a display (e.g., by generating a prompt to be displayed on display 312) prior to running the algorithm.

At step 1004, control circuitry 304 proceeds to retrieve the next instance of an acceptable authentication key from stored memory. In some embodiments control circuitry 304 may receive a single primitive data structure that represents the value of an acceptable authentication key. In some embodiments the value may be stored as part of a larger data structure, and control circuitry 304 may retrieve the value by executing appropriate accessor methods to retrieve the value from the larger data structure.

At step 1006, control circuitry 304 proceeds to compare the value of the retrieved acceptable authentication key to the stored value of the first authentication key received from the content aggregator server. In some embodiments, the value of the first authentication key received from the content aggregator server may be stored (e.g., on storage device 308) prior to beginning the algorithm. In some embodiments the value of the first authentication key received from the content aggregator server may also be retrieved for each and every instance of acceptable authentication key, and the value of first authentication key received from the content aggregator server may change from iteration to iteration. In some embodiments, control circuitry 304 may directly compare the value of the first authentication key received from the content aggregator server with the value of the acceptable authentication key by accessing the values respectively from memory and performing a value comparison. In some instances, control circuitry 304 may call a comparison function (e.g., for object to object comparison) to compare the acceptable authentication key and first authentication key received from the content aggregator server.

At step 1008, control circuitry 304 compares the values of the acceptable authentication key and first authentication key received from the content aggregator server to determine whether the value of the acceptable authentication key is equal to the value of first authentication key received from the content aggregator server. If the condition is satisfied, the algorithm may proceed to step 1010; if the condition is not satisfied, the algorithm may proceed to step 1012 instead.

At step 1010, control circuitry 304 will execute a subroutine to generate the first user account based on the condition at step 1008 being satisfied. After the subroutine is executed, the algorithm may proceed to step 1012 where it is determined whether all instances of the acceptable authentication key are accounted for and further iterations are needed.

At step 1014, control circuitry 304 will execute a subroutine to store the user account, if the control circuitry 304 previously generated the user account at step 1010.

It is contemplated that the descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1008, may be performed in any order or in parallel or simultaneously to reduce lag or increase the speed of the system or method. As a further example, in some embodiments several instances of the acceptable authentication key may be evaluated in parallel, using multiple logical processor threads, or the algorithm may be enhanced by incorporating branch prediction. Furthermore, it should be noted that the algorithm of FIG. 10 may be implemented on a combination of appropriately configured software and hardware, and that any of the devices or equipment discussed in relation to FIGS. 3-4 could be used to implement one or more portions of the algorithm.

The pseudocode in FIG. 11 describes an algorithm to generate an account on a content provider server based on receiving a first authentication key from a content aggregator server, in accordance with some embodiments of the disclosure. It will be evident to one skilled in the art that the algorithm described by the pseudocode in FIG. 11 may be implemented in any number of programming languages and a variety of different hardware, and that the style and format should not be construed as limiting, but rather a general template of the steps and procedures that would be consistent with code used to implement some embodiments of this disclosure.

At line 1101, the algorithm may run a subroutine to initialize variables and prepare to generate an account on a content provider server based on receiving a first authentication key from a content aggregator server, which begins on line 1105. For example, in some embodiments control circuitry 304 may copy instructions from non-transitory storage medium (e.g., storage device 308) into RAM or into the cache for processing circuitry 306 during the initialization stage. Additionally, in some embodiments the value of the first authentication key being used for comparison, or a tolerance level for determining if two values are essentially equivalent, may be retrieved, set, and stored at 1101.

At line 1105, control circuitry 304 may receive instances of an acceptable authentication key. In some embodiments these instances may be retrieved from stored memory. Control circuitry 304 may receive instances of an acceptable authentication key by receiving, for example, a pointer to an array of values of an acceptable authentication key. In another example, control circuitry 304 may receive an object of a class, such as an iterator object containing elements of an acceptable authentication key.

At line 1106, control circuitry 304 may iterate through the various instances of an acceptable authentication key, if only a single instance is available, the loop will only execute once. This loop may be implemented in multiple fashions depending on the choice of hardware and software language used to implement the algorithm of FIG. 11; for example, this may be implemented as part of a "for" or "while" loop.

At line 1107, control circuitry 304 will store the value of an acceptable authentication key into a temporary variable "A." In some embodiments the value of an acceptable authentication key will be stored as part of a larger data structure or class, and the value of an acceptable authentication key may be obtained through appropriate accessor methods. In some embodiments an acceptable authentication key may be converted from a string or other non-numeric data type into a numeric data type by means of an appropriate hashing algorithm. In some embodiments, control circuitry 304 may call a function to perform a comparison of an acceptable authentication key to the first authentication key. In some embodiments the acceptable authentication key may be encoded as a primitive data structure, and rather than using a temporary variable, an acceptable authentication key may be directly used in the comparisons at line 1109.

At line 1108, control circuitry 304 will store the value of the first authentication key into a temporary variable "B." Similar to an acceptable authentication key, in some embodiments the value of the first authentication key will be stored as part of a larger data structure or class, and the value of the first authentication key may be obtained through accessor methods. In some embodiments the first authentication key may be converted from a string or other non-numeric data type into a numeric data type by means of an appropriate hashing algorithm, or the first authentication key may be a primitive data structure, and may be directly used in the comparisons at line 1109.

At line 1109, control circuitry 304 compares the value of A to the value of B to see if they are equivalent.

At line 1110, control circuitry 304 will execute a subroutine to generate the first user account if the condition in line 1109 is satisfied.

At line 1112, control circuitry 304 will execute a subroutine to retrieve the next acceptable authentication key if the condition in line 1109 is not satisfied.

At line 1113, control circuitry 304 will execute a subroutine to store the generated user account, if control circuitry 304 had previously generated the account at line 1110. Control circuitry 304 may store the account in storage 308.

At line 1115, control circuitry 304 may run a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 1110 and 1112 to speed operation, or the conditional statement may be replaced with a case-switch. In some embodiments, rather than iterating over all instances of an acceptable authentication key at step 1006, in some embodiments the code may be rewritten so control circuitry 304 is instructed to evaluate multiple instances of acceptable authentication keys simultaneously on a plurality of processors or processor threads, lowering the number of iterations needed and potentially speeding up computation time.

Figure 12:
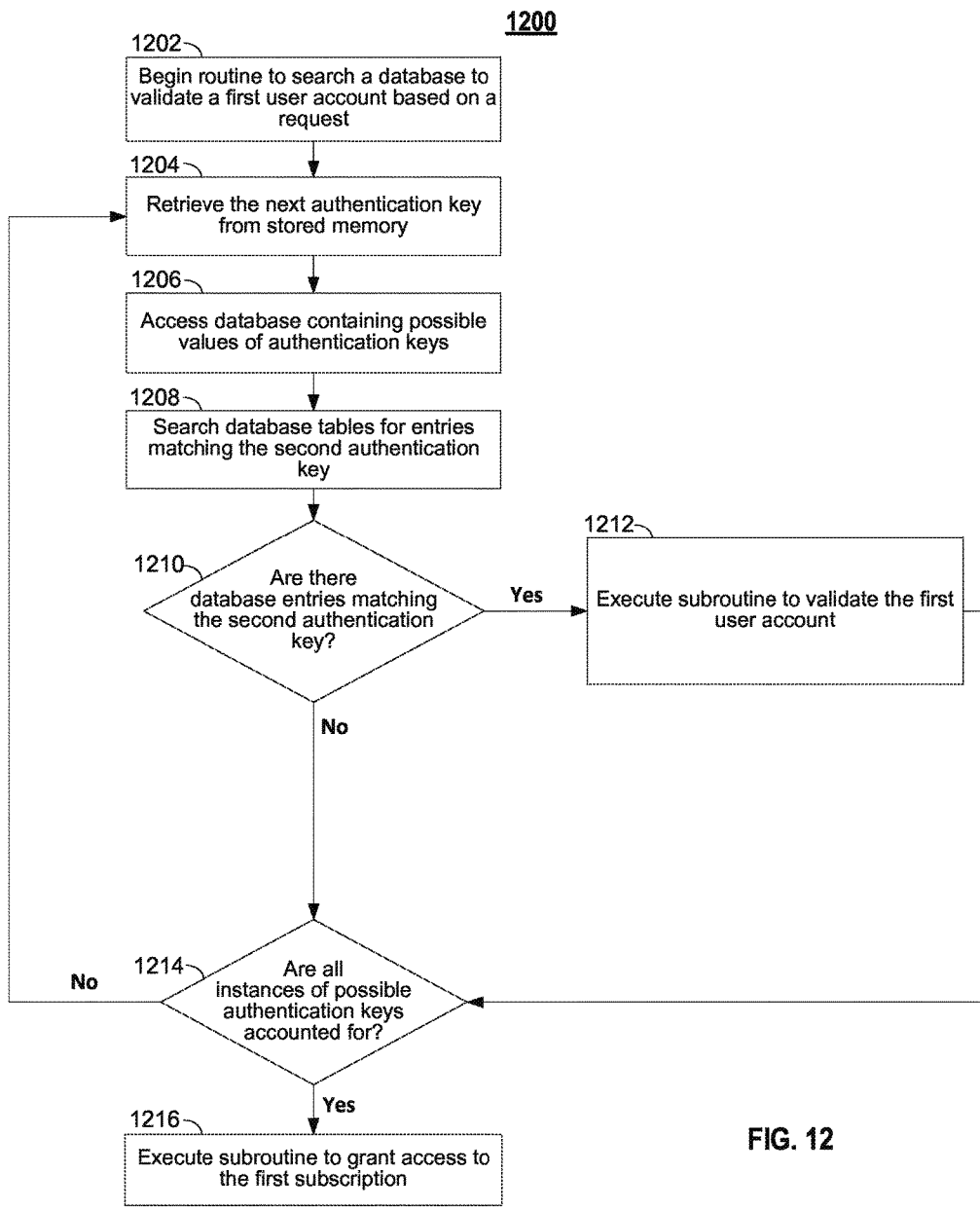
FIG. 12 is a flowchart of illustrative steps for validating a first user account based on a request from a content aggregator server, in accordance with some embodiments of the disclosure.

FIGS. 12 and 13 present an algorithm for control circuitry (e.g., control circuitry 304) to validate a first user account based on a request using a database containing possible values of authentication keys in accordance with some embodiments of the disclosure. Similar to the algorithms described by FIGS. 10 and 11, in some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 12 describes an algorithm for control circuitry (e.g., control circuitry 304) to search a database and validate a first user account based on a request in accordance with some embodiments of the disclosure.

At step 1202, the algorithm to search a database and to validate a first user account will begin based on a request. In some embodiments, this may be done either directly or indirectly in response to a user action or input (e.g., from signals received by control circuitry 304 or user input interface 310.)

At step 1204, control circuitry 304 proceeds to retrieve the next instance of the next authentication key from stored memory. In some embodiments control circuitry 304 may retrieve a single primitive data structure that represents the value of authentication key. In some embodiments control circuitry 304 may retrieve the value from a larger class or data structure.

At step 1206, control circuitry 304 accesses a database containing possible values of the type of the authentication key. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., content aggregator 430).

At step 1208, control circuitry 304 searches database tables for entries matching the authentication key. In some embodiments this may be done by comparing an identifier, for example a string or integer representing the authentication key, that matches the types of identifiers used inside the database. In some embodiments control circuitry 304 may submit a general query to the database for table entries matching the authentication key, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 12 may be implemented using multiple independent or cross-referenced databases.

At step 1210, control circuitry 304 may determine if there are database entries matching the authentication key. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the authentication key the algorithm proceeds to step 1212, otherwise the algorithm proceeds to step 1214.

At step 1212, control circuitry 304 will execute a subroutine to validate the user account. Afterwards, the algorithm may proceed to step 1214 where it is determined if there are further instances of the authentication key that need to be accounted for.

At step 1214, control circuitry 304 will determine if all instances of the authentication key are accounted for and if further iterations are needed. If further iterations are needed the algorithm will loop back to step 1204 where control circuitry 304 will retrieve the next instance of the authentication key. If no further iterations are needed the algorithm will proceed to step 1216.

At step 1216, control circuitry 304 will execute a subroutine to grant access to the first subscription.

It is contemplated that the descriptions of FIG. 12 may be used with any other embodiment of this disclosure. In addition, the descriptions described in relation to the algorithm of FIG. 12 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. Furthermore, it should be noted that the algorithm of FIG. 12 may be implemented on a combination of appropriately configured software and hardware, and that any of the devices or equipment discussed in relation to FIGS. 3-4 could be used to implement one or more portions of the algorithm.

The pseudocode in FIG. 13 describes an algorithm to validate a first user account based on a request in accordance with some embodiments of the disclosure. It will be evident to one skilled in the art that the algorithm described by the pseudocode in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1301, the algorithm may run a subroutine to initialize variables and prepare to validate the first user account based on the request, which begins on line 1305. For example, in some embodiments control circuitry 304 may copy instructions from non-transitory storage medium (e.g., storage device 308) into RAM or into the cache for processing circuitry 306 during the initialization stage.

At line 1305, control circuitry 304 may receive instances of acceptable authentication keys. In some embodiments these instances may be retrieved from stored memory.

At line 1306, control circuitry 304 may iterate through the various instances of acceptable authentication keys; if only a single instance is available, the loop will only execute once. This loop may be implemented in multiple fashions depending on the choice of hardware and software language used to implement the algorithm of FIG. 13; for example, this may be implemented as part of a "for" or "while" loop, in some programming languages. In some embodiments it may be convenient to store the instances of acceptable authentication keys in a single class or encapsulated data structure that will perform the loop as part of an internal method.

At line 1307, control circuitry 304 may query a database for entries matching acceptable authentication keys. Depending on how the database is implemented and how acceptable authentication keys are stored, an intermittent step may be required to convert acceptable authentication keys into a form consistent with the database. For example, acceptable authentication keys may be encoded into a string or an integer using an appropriate hashing algorithm prior to being transmitted to the database by control circuitry 304 as part of a query. In some embodiments acceptable authentication keys may be encoded as a primitive data structure, and control circuitry 304 may submit acceptable authentication keys as a query to the database directly. After querying the database, control circuitry 304 may receive a set of database entries matching acceptable authentication keys. In some embodiments control circuitry 304 may receive these entries in the form of a data-structure, a set of indices of the database, or a set of indices of another cross-referenced database.

At line 1309, control circuitry 304 will determine if there are any database entries matching acceptable authentication keys. In some embodiments control circuitry 304 may determine this by checking if the database returned an empty data structure or a NULL value in response to the query in line 1309. If there are matching database entries the algorithm may proceed to line 1309. If there were no matching database entries the algorithm may instead proceed to line 1312.

At line 1309, control circuitry 304 may retrieve one or more values of the first authentication key from the database entries matching acceptable authentication keys. For example, if control circuitry 304 retrieves a list of indices after querying the database in line 1307, in some embodiments control circuitry 304 may retrieve the database entries for the first authentication key located at the received indices. In some embodiments the indices may point to a larger data structure contained within the database, and control circuitry 304 may retrieve the values of the first authentication key from within the data structure using appropriate accessor methods. In some embodiments control circuitry 304 may retrieve the values of the first authentication key and store them in a separate data structure locally (e.g., in storage 308) prior to proceeding further. After retrieving the values of the first authentication key the algorithm will proceed to line 1310.

At line 1310, control circuitry 304 will execute a subroutine to use the values of the first authentication key and validate the first user account using control circuitry. Afterwards, the algorithm may proceed to line 1313.

At line 1312, control circuitry 304 will execute a subroutine to retrieve the next allowed authentication key using control circuitry 304 if the condition at line 1309 is not satisfied.

At line 1313, control circuitry 304 will execute a subroutine to grant access to the first user account. Afterwards, the algorithm may proceed to the termination subroutine at line 1315.

At line 1315, control circuitry 304 may execute a termination subroutine after the algorithm has performed its function and all instances of acceptable authentication keys have been processed and checked against the database. For example, in some embodiments control circuitry 304 may destruct variables, perform garbage collection, free memory or clear the cache of processing circuitry 306.

It will be evident to one skilled in the art that the algorithm described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of the acceptable authentication keys and submit multiple database queries simultaneously using a plurality of processors or processor threads. It is also understood that although we may describe control circuitry 304 interacting with a single database, this is only a single embodiment described for illustrative purposes, and the algorithm of FIG. 13 may be implement using multiple independent or cross-referenced databases. For example, a database stored locally (e.g., on storage 308) may index or cross-reference a database stored remotely (e.g., content aggregator 430), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 14:
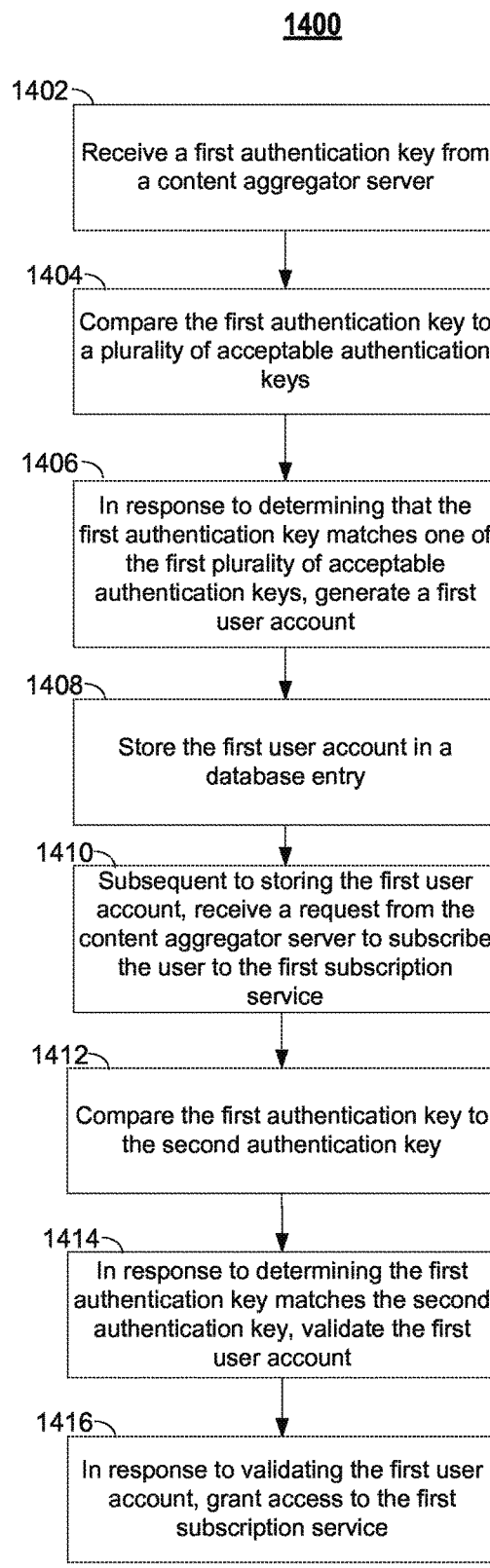
FIG. 14 is a flowchart of illustrative steps involved in generating and validating a first user account on a first subscription service, in accordance with some embodiments of the disclosure.

FIG. 14 is a flowchart of illustrative steps involved in generating and validating a first user account on a first subscription service. It should be noted that process 1400 or any step thereof could be performed on, or provided by, any of the devices shown in FIGS. 3-4. For example, process 1400 may be executed by control circuitry 304 (FIG. 3) as instructed by control circuitry implemented on user equipment 402, 404, and/or 406 (FIG. 4) in order to detect when the number of instances exceeds a certain number, and to transmit a message to a device. In addition, one or more steps of process 1400 may be incorporated into or combined with one or more steps of any other process or embodiment.

Process 1400 begins at step 1402, where control circuitry 304 receives a first authentication key from a content aggregator server. For example, the entity offering the second subscription service (e.g., Rovi Super Aggregator) may come to an agreement with the entity first subscription service (e.g., Hulu) to offer, at a discount, a subscription to the first subscription service to users of the second subscription service. Prior to the user subscribing to the first subscription service, control circuitry 304 implemented on the content aggregator server transmits a first authentication key to the content aggregator server.

At step 1404, control circuitry 304 compares the first authentication key to a plurality of acceptable authentication keys. For example, control circuitry 304 implemented on the content provider server may extract information stored in the first authentication key, and determine the name of the subscription service (e.g., Rovi Super Aggregator) listed in the part of the key related to identifier of the second subscription service. Control circuitry 304 may then retrieve a list of subscription services that control circuitry 304 had previously identified to be permitted to generate accounts on the first subscription service, and compare the name of the subscription service to each subscription service in the retrieved list. In effect, control circuitry 304 implemented on the content provider server can securely receive information about new users from content aggregators (i.e., the second subscription service), while maintaining control over the accounts that are created. For example, a first subscription service may enter into an agreement with a second subscription service to offer subscriptions on the first subscription service at a discounted price. By encapsulating information about the second subscription service in the authentication key, the first subscription service ensures that only accounts of users associated with trusted content aggregators are created.

At step 1406, control circuitry 304, in response to determining that the first authentication key matches one of the first plurality of acceptable authentication keys, generates a first user account. For example, control circuitry 304 may extract the information contained in the authentication key, such as a username, password, and subscription service name in order to create the information necessary for generating an account on the content provider server. In some instances, control circuitry 304 may store an indication associated with the first account, specifying that the account is not yet validated.

At step 1408, control circuitry 304 stores the first user account in a database entry or example, control circuitry 304 implemented on the content provider server may store the information related to the generated user account in a database entry stored in a database. Control circuitry 304 may also associate the user account with the authentication key, for example, by storing a pointer to the location of the authentication key in the database entry associated with the user account. By associating the stored user account with the first authentication key, control circuitry 304 implemented on the content aggregator server may ensure that the account may be quickly validated in the event that the second subscription or the user decides to validate the account on the first subscription service. In some instances, control circuitry 304 may store the first authentication key in a location in storage 308, where the location is identified by a path. Control circuitry 304 may then store the path to the location in a database entry corresponding to the first user account.

At step 1410, control circuitry 304, subsequent to storing the first user account, receives a request from the content aggregator server to subscribe the user to the first subscription service. Control circuitry 304 may receive the second authentication key in response to a user request to subscribe to the first subscription service. For example, control circuitry 304 implemented on the content aggregator server may detect that a user of the second subscription service (e.g., Rovi Super Aggregator) desires to subscribe to the first subscription service (e.g., Hulu). In a different example, control circuitry 304 implemented on the second service may automatically send a request to the first service, when the cost of subscribing to the first service meets a cost criterion. Control circuitry 304 on the first subscription service may decrypt the information stored in the second key, retrieve information stored in the second key, and store the authentication key on the content provider server.

At step 1412, control circuitry 304 compares the first authentication key to the second authentication key. For example, control circuitry 304 implemented on the content provider server may retrieve information from the second key related to the name of the user associated with the key, and may then query the database to determine whether an account associated with the identified user exists. Optionally, control circuitry 304 may then retrieve the first authentication key (i.e., from storage 308 or from the database) associated with the account of the identified user. Control circuitry 304 may further compare the second authentication key with the first authentication key, with or without decrypting the data stored in the keys.

At step 1414, control circuitry 304, in response to determining the first authentication key matches the second authentication key, validates the first user account. For example, based on the comparing of the first authentication key to the second authentication key, control circuitry 304 implemented on the content provider server may then identify the user account associated with either key. Control circuitry 304 may then query the database to identify the account and store an indication specifying that the account has been validated. In one example, control circuitry 304 may identify a database record associated with the identified account, and set the field associated with whether the account is validated (e.g., field IS_VALIDATED) to a value indicating that the account is validated.

At step 1416, control circuitry 304, in response to validating the first user account, grants access to the first subscription service. For example, control circuitry 304 implemented on the content provider server may generate and transmit a message to the content aggregator server, indicating that the account is available for use. Thus, control circuitry 304 implemented on the content provider server is able to notify the user that the offerings of the second subscription service may be accessed by the user.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method for managing credential information across multiple subscription services, comprising:
   receiving, at a content provider server that is associated with a first subscription service, a first authentication key from a content aggregator server that is associated with a second subscription service, wherein the first authentication key is received prior to a user subscribing to the first subscription service;
   comparing the first authentication key to a first plurality of acceptable authentication keys to determine whether or not to generate a first user account for the first subscription service based on the first authentication key;
   in response to determining that the first authentication key matches one of the first plurality of acceptable authentication keys, generating, at the content provider server, the first user account;
   storing, at the content provider server, the first user account in a database entry that indicates that the first user account corresponds to the first authentication key;
   subsequent to storing the first user account, receiving, at the content provider server, a request from the content aggregator server to subscribe the user to the first subscription service, wherein the request includes a second authentication key;
   comparing the first authentication key to the second authentication key;
   in response to determining that the first authentication key matches the second authentication key, validating the first user account; and
   in response to validating the first user account, granting access to the first subscription service through the first user account.

2. The method of claim 1, wherein the first authentication key is an encryption key based on a user name and password for the user assigned by the second subscription service.

3. The method of claim 1, wherein the first plurality of acceptable authentication keys is received at the content provider server from the content aggregator server.

4. The method of claim 1, wherein the database entry includes a first database field that includes a pointer to the first user account and a second database field that includes the first authentication key.

5. The method of claim 1, wherein the database entry includes a third database field that includes subscription terms for the first subscription service.

6. The method of claim 1, wherein the request from the content aggregator server to subscribe the user to the first subscription service is transmitted from the content aggregator server without further user input in response to the user selecting a subscription level for the second subscription service at the content aggregator server.

7. The method of claim 1, further comprising transmitting, from the content provider server, a second subscription service confirmation to the content aggregator server in response to validating the first user account.

8. The method of claim 1, further comprising:
   receiving a second request from the content aggregator server to access media content of the first subscription service through the first user account; and
   in response to receiving the second request from the content aggregator server to access media content of the first subscription service through the first user account, creating a direct connection between the content provider server and a user equipment device.

9. The method of claim 8, further comprising:
retrieving a user interface skin associated with the first subscription service in response to the direct connection between the content provider server and the user equipment device; and
generating for display media content listings using the user interface skin.

10. The method of claim 9, further comprising:
receiving, from the content aggregator server, a user selection through the first user account of a media content listing; and
generating for display a media asset corresponding to the media content listing.

11. A system for managing credential information across multiple subscription services, the system comprising control circuitry configured to:
receive, at a content provider server that is associated with a first subscription service, a first authentication key from a content aggregator server that is associated with a second subscription service, wherein the first authentication key is received prior to a user subscribing to the first subscription service;
compare the first authentication key to a first plurality of acceptable authentication keys to determine whether or not to generate a first user account for the first subscription service based on the first authentication key;
in response to determining that the first authentication key matches one of the first plurality of acceptable authentication keys, generate, at the content provider server, the first user account;
store, at the content provider server, the first user account in a database entry that indicates that the first user account corresponds to the first authentication key;
subsequent to storing the first user account, receive, at the content provider server, a request from the content aggregator server to subscribe the user to the first subscription service, wherein the request includes a second authentication key;
compare the first authentication key to the second authentication key;
in response to determining that the first authentication key matches the second authentication key, validate the first user account; and
in response to validating the first user account, grant access to the first subscription service through the first user account.

12. The system of claim 11, wherein the first authentication key is an encryption key based on a user name and password for the user assigned by the second subscription service.

13. The system of claim 11, wherein the first plurality of acceptable authentication keys is received at the content provider server from the content aggregator server.

14. The system of claim 11, wherein the database entry includes a first database field that includes a pointer to the first user account and a second database field that includes the first authentication key.

15. The system of claim 11, wherein the database entry includes a third database field that includes subscription terms for the first subscription service.

16. The system of claim 11, wherein the request from the content aggregator server to subscribe the user to the first subscription service is transmitted from the content aggregator server without further user input in response to the user selecting a subscription level for the second subscription service at the content aggregator server.

17. The system of claim 11, wherein the control circuitry is further configured to transmit, from the content provider server, a second subscription service confirmation to the content aggregator server in response to validating the first user account.

18. The system of claim 11, wherein the control circuitry is further configured to:
receive a second request from the content aggregator server to access media content of the first subscription service through the first user account; and
in response to receiving the second request from the content aggregator server to access media content of the first subscription service through the first user account, create a direct connection between the content provider server and a user equipment device.

19. The system of claim 18, wherein the control circuitry is further configured to:
retrieve a user interface skin associated with the first subscription service in response to the direct connection between the content provider server and the user equipment device; and
generate for display media content listings using the user interface skin.

20. The system of claim 19, wherein the control circuitry is further configured to:
receive, from the content aggregator server, a user selection through the first user account of a media content listing; and
generate for display a media asset corresponding to the media content listing.

\* \* \* \* \*